(12) United States Patent
Rolia et al.

(10) Patent No.: US 11,343,374 B1
(45) Date of Patent: May 24, 2022

(54) MESSAGE AGGREGATION AND COMPARING

(71) Applicant: Amazon Technologies, Inc., Seattle, WA (US)

(72) Inventors: Jerome Alexander Rolia, Kanata (CA); Brian Alexander Oliver, Seattle, WA (US); Vikram Kumar Gundeti, Bellevue, WA (US); Balraja Subbiah, Madurai (IN); Tony Roy Hardie, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 33 days.

(21) Appl. No.: 15/842,581

(22) Filed: Dec. 14, 2017

(51) Int. Cl.
| | | |
|---|---|---|
| *H04M 7/00* | (2006.01) | |
| *H04L 29/06* | (2006.01) | |
| *H04Q 11/04* | (2006.01) | |
| *H04L 12/66* | (2006.01) | |
| *H04M 3/436* | (2006.01) | |
| *G10L 15/22* | (2006.01) | |
| *G10L 15/18* | (2013.01) | |
| *H04L 65/1076* | (2022.01) | |
| *H04M 3/22* | (2006.01) | |
| *H04M 3/36* | (2006.01) | |
| *H04M 3/42* | (2006.01) | |
| *G10L 15/30* | (2013.01) | |

(52) U.S. Cl.
CPC ......... *H04M 3/436* (2013.01); *G10L 15/1815* (2013.01); *G10L 15/22* (2013.01); *H04L 65/1079* (2013.01); *H04M 3/2281* (2013.01); *H04M 3/36* (2013.01); *H04M 3/42068* (2013.01); *G10L 15/30* (2013.01); *H04M 3/42161* (2013.01); *H04M 2242/30* (2013.01)

(58) Field of Classification Search
CPC .... H04M 7/006; H04M 3/436; H04M 3/2281; H04M 3/36; H04M 3/42068; H04L 29/06027; H04L 12/66; H04L 29/06; H04L 65/1079; H04Q 11/04; G10L 15/1815; G10L 15/22
USPC ....................................................... 370/259
See application file for complete search history.

(56) References Cited

U.S. PATENT DOCUMENTS

| | | | | |
|---|---|---|---|---|
| 7,673,315 B1 * | 3/2010 | Wong | ................. | H04N 5/44543 386/254 |
| 7,734,251 B1 * | 6/2010 | Harvey | ............. | H04N 21/2407 |
| 7,769,344 B1 * | 8/2010 | Harvey | ............. | G06Q 30/0251 345/629 |

(Continued)

OTHER PUBLICATIONS

Office Action dated Nov. 15, 2019 in U.S. Appl. No. 15/842,557.

*Primary Examiner* — Peter G Solinsky
*Assistant Examiner* — Sanjay K Dewan
(74) *Attorney, Agent, or Firm* — Pierce Atwood LLP

(57) ABSTRACT

Techniques for detecting spam accounts in a system are described. The system may analyze speech characteristics of communication content (e.g., telephone call content, VoIP content, audio messaging, etc.) to determine whether multiple devices or user profiles are associated with overlapping communications. The system may also analyze text transcriptions of communication content to determine whether multiple devices or user profiles are associated with overlapping communications. If so, the system may mitigate, such as throttling service, disabling accounts, and the like.

20 Claims, 16 Drawing Sheets

(56) References Cited

U.S. PATENT DOCUMENTS

| | | | | |
|---|---|---|---|---|
| 8,346,906 | B2* | 1/2013 | Shaffer | H04L 49/90 370/259 |
| 9,037,113 | B2 | 5/2015 | Balasubramaniyan et al. | |
| 9,712,681 | B1 | 7/2017 | Cohen et al. | |
| 10,237,081 | B1* | 3/2019 | Narayanaswamy | H04L 12/1818 |
| 10,504,520 | B1* | 12/2019 | Roy | G10L 17/22 |
| 10,694,033 | B2 | 6/2020 | Quilici et al. | |
| 2002/0091528 | A1* | 7/2002 | Daragosh | G10L 15/30 704/270.1 |
| 2008/0256602 | A1* | 10/2008 | Pagan | H04L 51/04 726/3 |
| 2014/0199975 | A1* | 7/2014 | Lou | H04W 4/16 455/414.1 |
| 2014/0372363 | A1* | 12/2014 | Chestnut | G06Q 10/107 706/52 |
| 2015/0356630 | A1* | 12/2015 | Hussain | G06Q 30/0273 705/14.69 |
| 2017/0085985 | A1* | 3/2017 | Kim | H04R 3/005 |
| 2018/0097841 | A1* | 4/2018 | Stolarz | H04L 63/1483 |

* cited by examiner

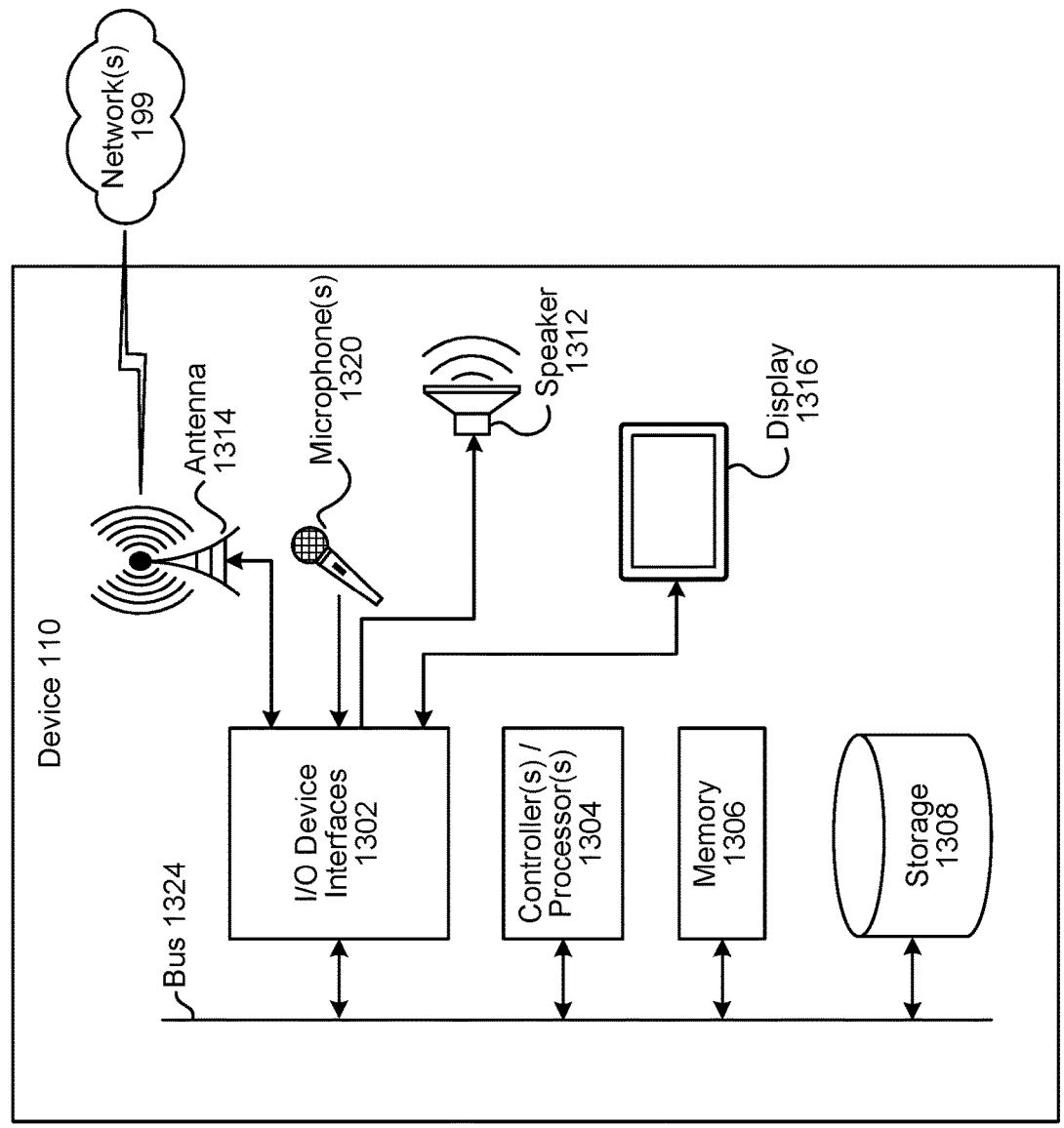

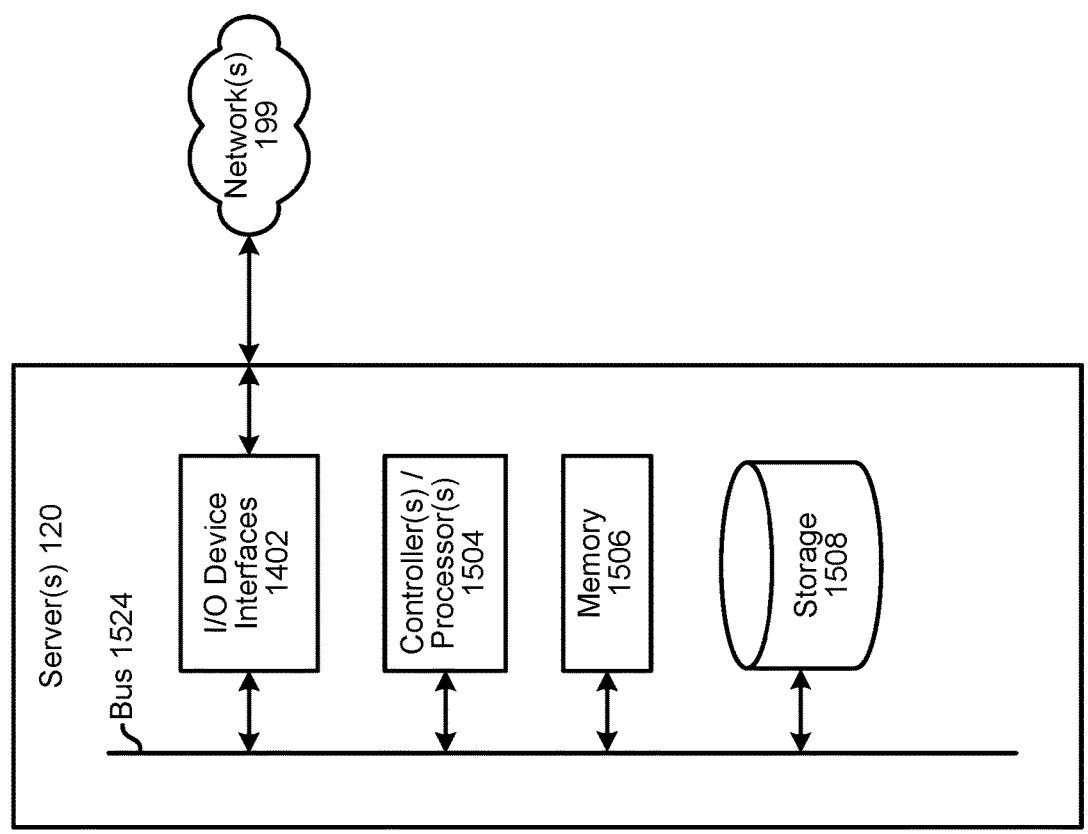

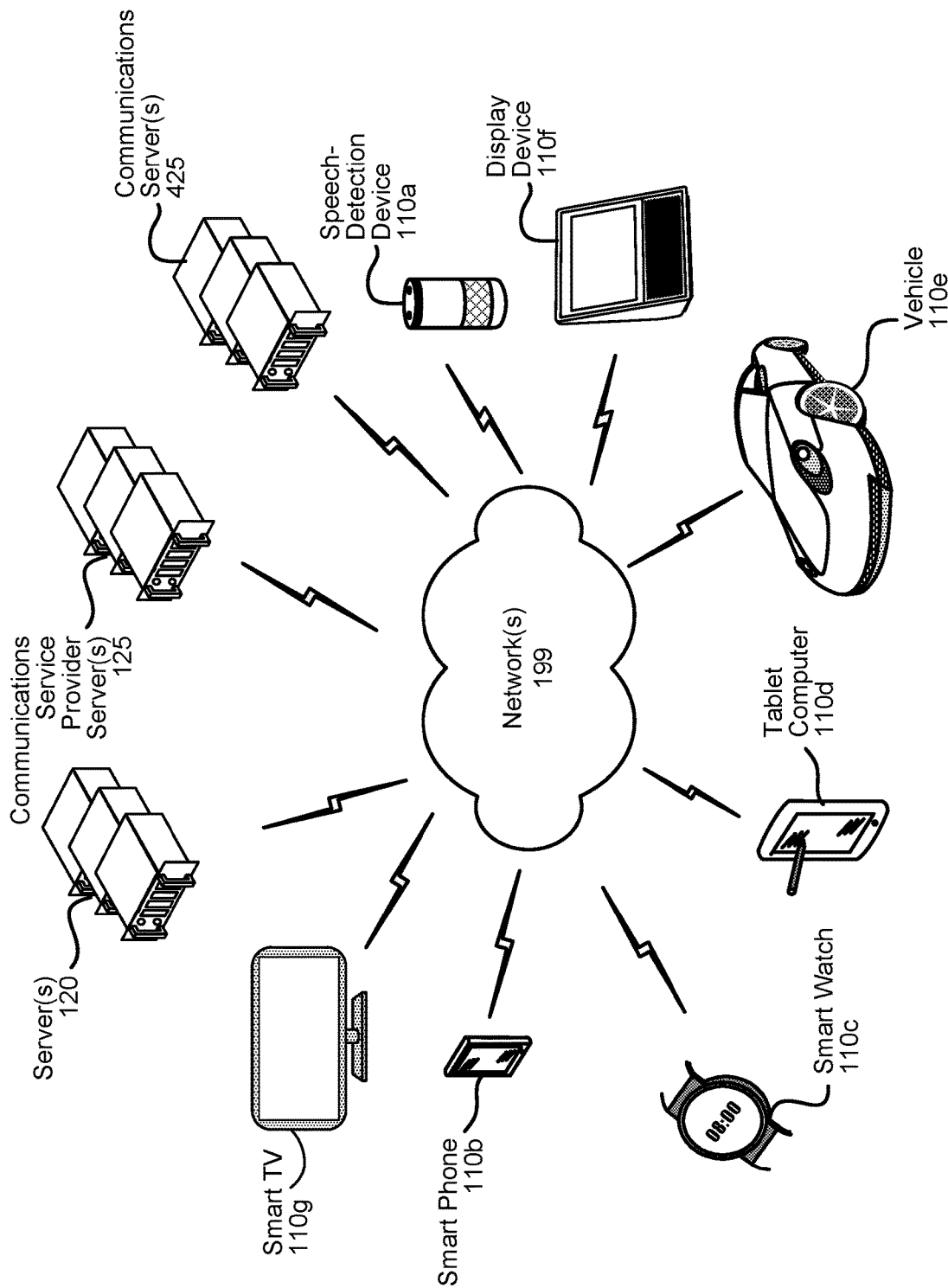

MESSAGE AGGREGATION AND COMPARING

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 13 is a block diagram conceptually illustrating example components of a device according to embodiments of the present disclosure.

FIG. 14 is a block diagram conceptually illustrating example components of a server according to embodiments of the present disclosure.

FIG. 15 illustrates an example of a computer network for use with the speech processing system.

DETAILED DESCRIPTION

Figure 1:
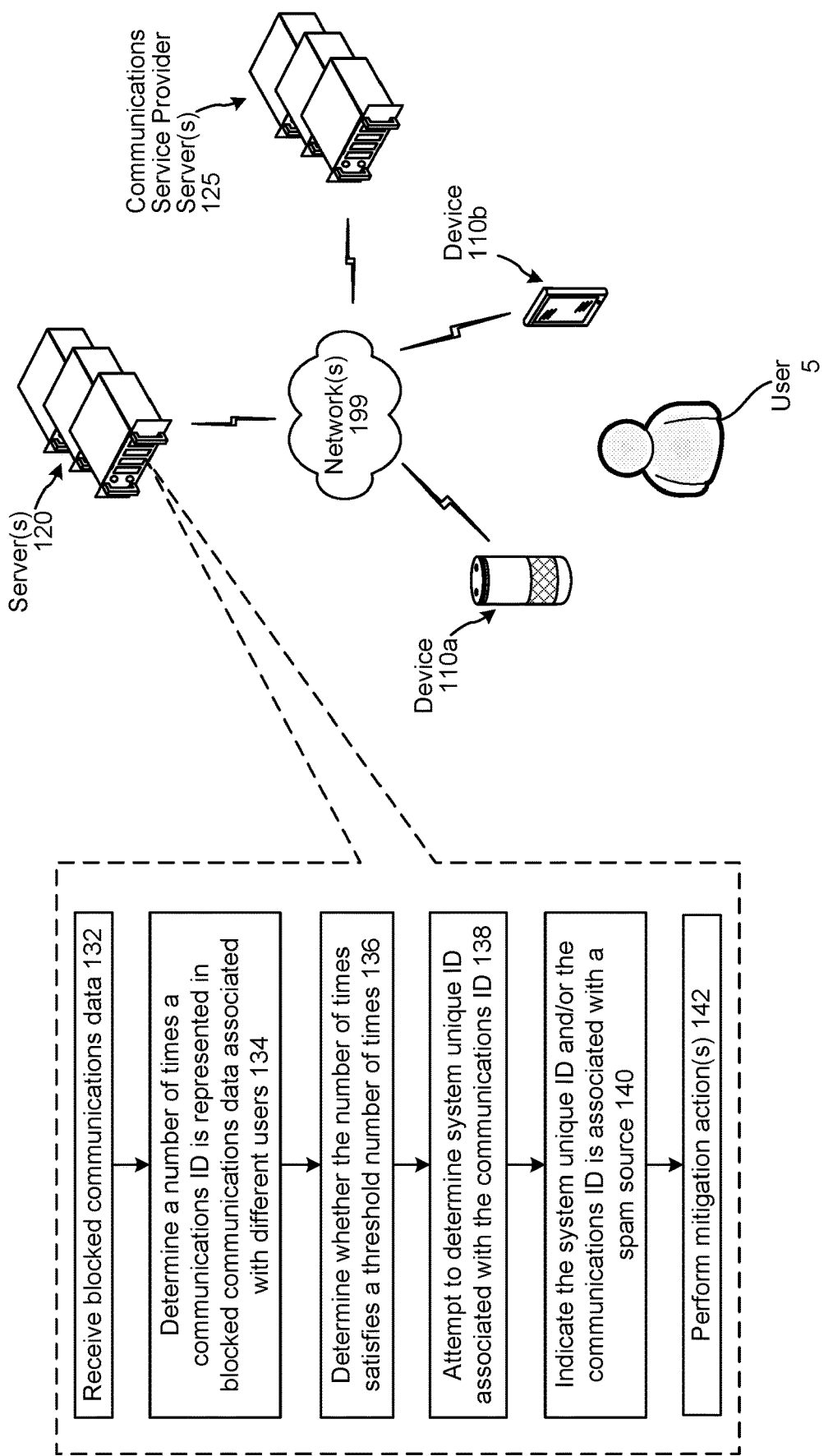
FIG. 1 illustrates a system configured to detect communications identifiers associated with spammers based on blocked communications information according to embodiments of the present disclosure.

Automatic speech recognition (ASR) is a field of computer science, artificial intelligence, and linguistics concerned with transforming audio data associated with speech into text data representative of that speech. Natural language understanding (NLU) is a field of computer science, artificial intelligence, and linguistics concerned with enabling computers to derive meaning from text input containing natural language. Text-to-speech (TTS) is a field of computer science, artificial intelligence, and linguistics concerned with enabling computers to output synthesized speech. ASR, NLU, and TTS may be used together as part of a speech processing system.

Spammers have become sophisticated in their efforts to get communications (e.g., calls, emails, short message service (SMS) messages, etc.) recipients to answer or otherwise respond to their solicitations. In some instances, spammers select an outgoing phone number (that is to appear on the caller ID of the recipient's device) having an area code corresponding to that of the recipient. In this effort, a spammer attempts to trick a recipient into thinking the communication is originating from someone local to them when, in fact, the communication may be originating from a distant location, even a different continent.

In such an instance, the outgoing phone number to be displayed to the recipient does not correspond to an incoming phone number received by the system that is to send the communication to the recipient. For example, a device may send call or message content to a distributed system along with an indication of an outgoing communications ID (e.g., phone number, VoIP unique ID, email address, etc.) that should be displayed in the caller ID of a recipient device. The call or message content and the outgoing communications ID may be associated with an incoming communications ID associated with the device that originated the call or message. The distributed system may consider when an incoming communications ID (associated with a communication originating device) is different from an outgoing communications ID (to be displayed to a recipient) in determining spam activity.

As used herein, "spammer" refers to a telemarketer, fraudster, automated bot, or the like. As further used herein, "spam," "spam communications," "spam calls," "spam messages," and the like refer to communications initiated by telemarketers, fraudsters, or the like.

A user device may allow a user to indicate a communications number (e.g., phone number or voice over internet protocol (VoIP) number) is associated with a spammer. For example, a caller ID screen may present a user with a virtual button that enables the user to block a communications number while the communications number attempts to establish a call with the user. For further example, a user may activate a call history on their device, select an entry corresponding to a spam call, and therein block the communications number associated with the entry. Yet further, for example, a user may receive a text or audio message from a communications number. If the message is spam, the user may block the communications number that originated the message. The user device and/or a communications service provider (e.g., cellular service provider) may store the communications numbers blocked using the user device. While this may help the particular user identify communications that are spam, a particular user's blocking of a communications number does not help other potential users of a distributed system identify and evade the spammer's communications.

The present disclosure leverages blocked communications numbers lists to proactively limit communications made by spammers to various users of a distributed system. When an individual creates a profile with a system (or otherwise signs up for functionality of the system), the system may ingest a blocked communications list of the individual. For example, if the individual creates a profile with the system using a smart phone, the system may ingest the blocked communications list stored by the smart phone (or stored by the cellular service provider associated with the smart phone). The system may then determine how many times each blocked communications number represented in the ingested blocked communications list is included in blocked communications lists of various users of the system. If a blocked communications number represented in the ingested blocked communications list is included in at least a threshold number of other blocked communications lists, the system may mark the communications number as spam at a system level and engage in appropriate mitigation techniques (e.g., throttle the phone numbers activity, disable the phone number's ability to communicate with system devices, etc.).

FIG. 1 illustrates a system configured to detect communications identifiers associated with spammers based on blocked communications information. Although the figures and discussion illustrate certain operational steps of the system in a particular order, the steps described may be performed in a different order (as well as certain steps removed or added) without departing from the intent of the disclosure. Devices (110a/110b) local to a user 5, one or more server(s) 120, and one or more communications service provider server(s) 125 may communicate across one or more networks 199.

The user 5 may interact with the device 110b to create a profile with the server(s) 120 and/or register the device 110a with a profile stored by the server(s) 120. During the profile setup process or sometime thereafter, the user 5 may indicate the device 110b (or a communications service provider server(s) 125 associated with the device 110b) should send the server(s) 120 blocked communications data representing communications the user 5 blocked.

If the communications service provider server(s) 125 is to send the blocked communications data to the server(s) 120, the device 110b may send an instruction to the communications service provider server(s) 125. The instruction may include data representing the server(s) 120, a unique ID of the device 110b (e.g., a serial number, phone number, etc.), as well as an instruction to send blocked communications data associated with the unique ID to the server(s) 120.

Blocked communications data may represent one or more communications numbers, one or more communications origination internet protocol (IP) addresses, or some other unique communications source identifying information (e.g., email address). Such may be collectively referred to herein as communications identifiers (IDs).

The device 110b or the communications service provider server(s) 125 sends blocked communications data to the server(s) 120, which the server(s) 120 receives (132). The blocked communications data may represent multiple blocked communications and multiple blocked communications IDs, and may not be limited to blocked communications ID most recently blocked by the user 5 using the device 110b.

The system may have previously ingested blocked communications data for different users of the system. The server(s) 120 determines (134), for each communications ID represented in the recently received blocked communications data, a number of times the communications ID is represented in the blocked communications data associated with the different users of the system.

The system may then determine (136) whether the number of times the communications ID is represented in the different blocked communications data satisfies a threshold number of different blocked communications data. The threshold number of different blocked communications data may represent a system delineation between blocked communications IDs that are associated with non-spammer sources and blocked communications IDs that are associated with spammer sources.

If the number of times the communications ID is represented in the different blocked communications data satisfies the threshold number of different blocked communications data, the system attempts to determine (138) a system unique ID associated with the communications ID. A communications ID may be associated with a third party communications service provider (e.g., a cellular network service provider, a voice over internet protocol (VoIP) communications provider, etc.). The system of the present disclosure may be not be configured to send outgoing communications using such a third party communications ID. Thus, the system may include system IDs that are used by the herein disclosed system to send outgoing communications and that are associated with third party communications IDs.

The server(s) 120 then indicates (140) the system unique ID and/or the communications ID is associated with a spam source. Such indication may include associating the system unique ID or communications ID with a spam flag. Alternatively or in addition, such indication may include representing the system unique ID or the communications ID in a list of spam IDs.

The server(s) 120 may also perform (142) one or more mitigation actions. An example mitigation action includes temporarily or permanently disabling the unique IDs ability to send communications (e.g., calls or messages) to devices 110 associated with the server(s) 120. If the unique ID is associated with a profile stored by the server(s) 120, another example mitigation action includes temporarily or permanently disabling the profile. Moreover, if the unique ID is associated with a profile stored by the server(s) 120, an example mitigation action includes sending an instruction to a device, associated with the profile, to output a prompt indicating that further spamming activity may result in the profile being disabled. A further example mitigation action includes throttling (e.g., decreasing) the amount of communications associated with the unique ID that the system will send to recipients.

As described above, blocked communications data may represent one or more communications origination internet protocol (IP) addresses. Accordingly, one skilled in the art will appreciate that steps 134-140 may be performed with respect to communications originating address information, as opposed to or in addition to being performed with respect to communications ID as described with respect to FIG. 1 above.

In some instances, a user may add a spam communications ID to their contact list and name the contact as spam, spammer, telemarketer, fraudster, or the like. While this may help the particular user identify communications that are spam, a particular user's labeling of a communications ID as spam does not help other potential users of the distributed system identify and evade the spammer's communications.

The present disclosure leverages the names of contacts in contacts lists to proactively limit communications made by spammers to various users of the distributed system. When an individual creates a profile with the system (or otherwise signs up for functionality of the system), the system may ingest a contact list of the individual. For example, if the individual creates a profile with the system using a smart phone, the system may ingest the contact list stored by the smart phone (or stored by the cellular service provider associated with the smart phone). The system may analyze the ingested contact list to determine contacts having names such as spam, spammer, telemarketer, or the like. The system may then determine a phone number associated with such a named contact, determine other contact lists including the phone number, and determine how many of the other contact lists similarly name the phone number as associated spam, spammer, telemarketer, or the like. If the number of other contact lists indicating the phone number is associated with spam exceed a threshold, the system may mark the phone number as spam at a system level and engage in appropriate mitigation techniques (e.g., throttle the phone numbers activity, disable the phone number's ability to communicate with system devices, etc.)

Figure 2:
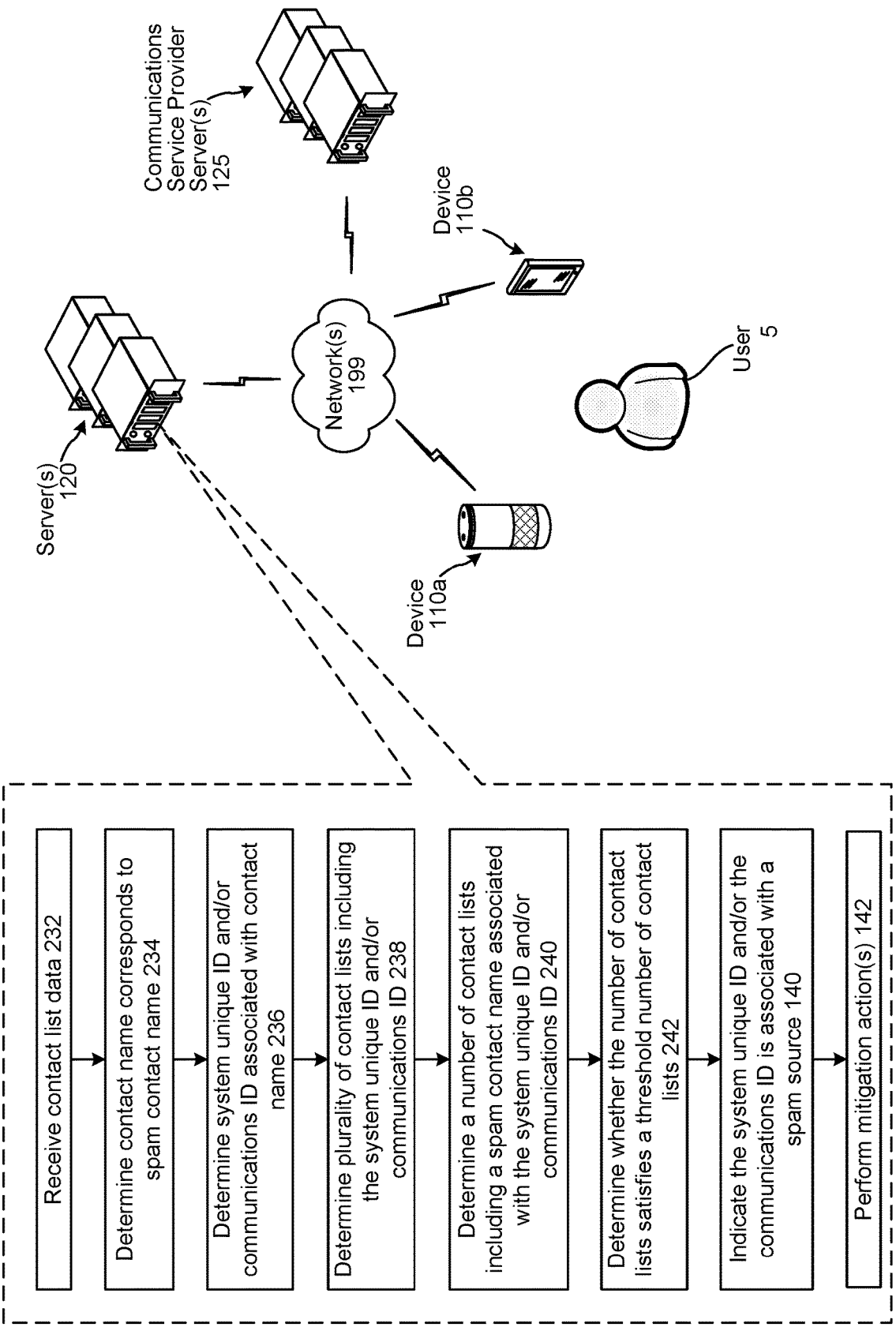
FIG. 2 illustrates a system configured to detect communications identifiers associated with spammers based on contact list information according to embodiments of the present disclosure.

FIG. 2 illustrates a system configured to detect communications IDs associated with spammers based on contact list information. The user 5 may interact with the device 110*b* to create a profile with the server(s) 120 and/or register the device 110*a* with a profile stored by the server(s) 120. During the profile setup process or at some time after the profile has been created, the user 5 may indicate the device 110*b* (or a communications service provider server(s) 125 associated with the device 110*b*) should send the server(s) 120 contact list data. The contact list data may represent a contact list stored by the device 110*b*, and optionally one or more communications service provider servers 125 associated with the device 110*b*.

If the communications service provider server(s) 125 is to send the contact list data to the server(s) 120, the device 110*b* may send an instruction to the communications service provider server(s) 125. The instruction may include data representing the server(s) 120, a unique ID of the device 110*b* (e.g., a serial number, phone number, etc.), as well as an instruction to send contact list data associated with the unique ID to the server(s) 120.

The device 110*b* or the communications service provider server(s) 125 sends contact list data to the server(s) 120, which the server(s) 120 receives (232).

The server(s) 120 determines (234), within the contact list data, a contact name corresponding to a spam contact name. Illustrative spam contact names include spam, spammer, telemarketer, and the like. The server(s) 120 may compare text of contact names in the contact list data to text in a list of spam contact names to identify spam contact names in the contact list data. The server(s) 120 may thereafter determine (236) a system unique ID and/or communications ID associated with the spam contact name.

The server(s) 120 may determine (238) a plurality of contact lists (embodied as separate contact list data associated with respective user profiles of the system) including the system unique ID and/or communications ID. Thereafter, the server(s) 120 may determine (240) a number of the plurality of contact lists having the system unique ID and/or communications ID associated with a spam contact name.

The server(s) 120 may determine whether the number of contact lists having the system unique ID and/or communications ID associated with a spam contact name satisfies threshold number of contact lists. The threshold number of contact lists may represent a system delineation between system unique IDs and/or communications IDs that are associated with non-spammer sources and system unique IDs and/or communications IDs that are associated with spammer sources.

If the server(s) 120 determines the number of contacts lists satisfies the threshold number of contact lists, the server(s) 120 indicates (140) the system unique ID and/or the communications ID is associated with a spam source. The server(s) 120 may therafter perform (7142) one or more mitigation actions.

Spammers may also use scripting and automated bots to initiate multiple calls or send multiple messages in parallel. For example, a spammer may record a message and, using automated techniques, cause communications to be sent to multiple recipients at or substantially at the same time. The spammer may use multiple profiles (with each profile being associated with a different system unique ID) to send communications to multiple recipients at or substantially at the same time. Each account in isolation may not be used in a manner that triggers spam securities of the system.

To address this as well as other issues, the present disclosure provides techniques for determining spam activity on a multi-profile level. The system may analyze whether multiple profiles are operating together to cause abusive behavior even though the system may not be able to determine each profile individually is being operated in an abusive manner.

With user permission, the system may analyze characteristics of audio that is sent to recipients or that was sent to recipients and is stored in electronic mailboxes. If the system determines characteristics of audio associated with different contemporaneous communications are associated with the same user ID, the system may identify the user ID as that of a spammer. For example, if two separate communications overlap in time and the two separate communications are associated with the same user ID based on the communications having the same or substantially similar audio characteristics, then the system may determine the user ID is being operated by a spammer.

Figure 3:
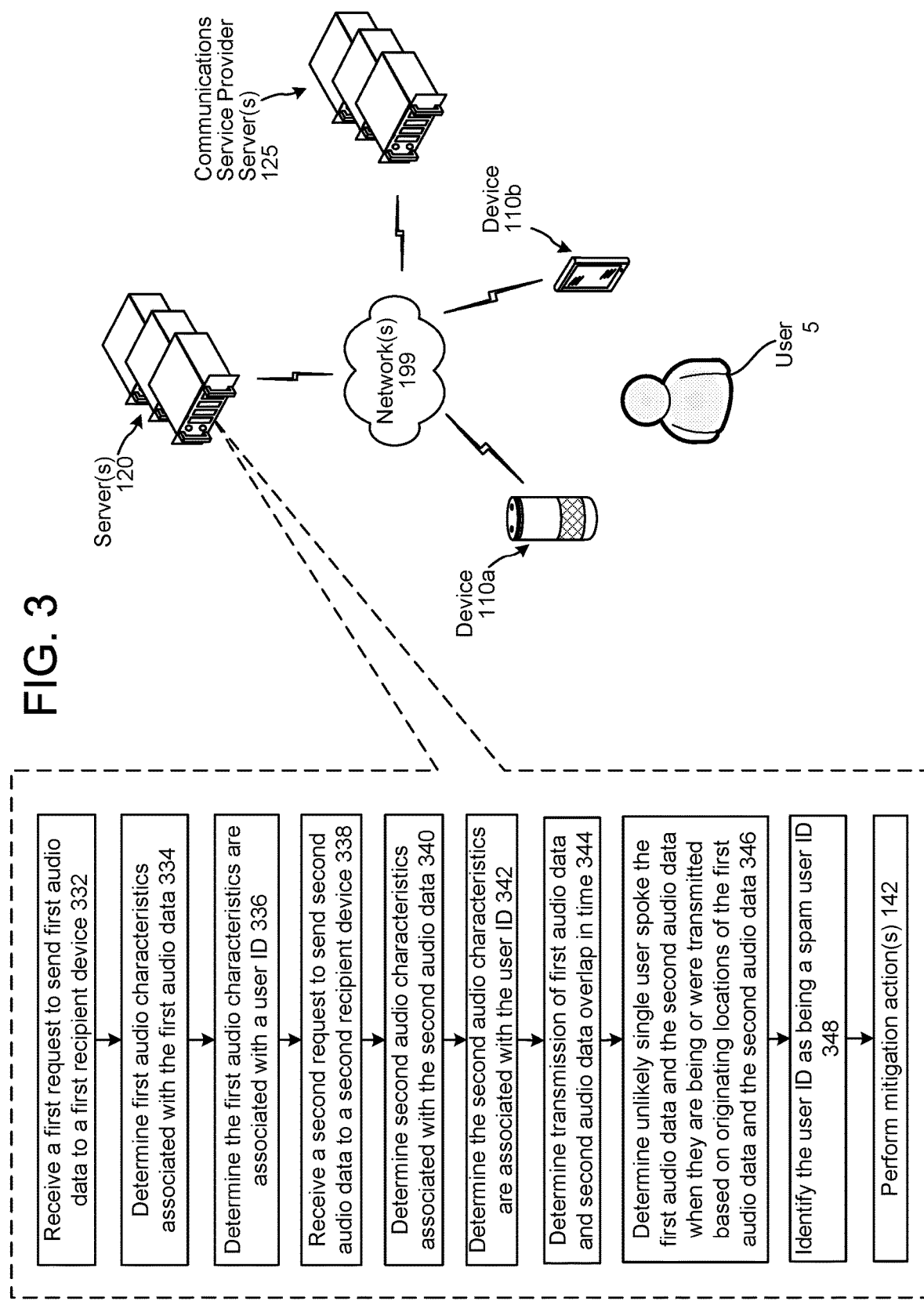
FIG. 3 illustrates a system configured to detect user identifiers associated with spammers based on separate overlapping communications being associated with the same user identifier according to embodiments of the present disclosure.

FIG. 3 illustrates a system configured to detect user IDs associated with spammers based on separate overlapping communications being associated with the same user ID. The server(s) 120 may receive (332), during a time period, a first request to send first audio data to a first recipient device. The server(s) 120 may determine (334) first audio characteristics (e.g., speech characteristics) associated with the first audio data and may determine (336) the first audio characteristics are associated with a user ID.

The server(s) 120 may also receive (338), during the first time period, a second request to send second audio data to a second recipient device. The server(s) 120 may determine (340) second audio characteristics associated with the second audio data and may determine (342) the second audio characteristics are associated with the user ID associated with the first audio data.

The server(s) 120 may determine (344) the transmissions of the first audio data and second audio data overlap in time. For example, the server(s) 120 may determine the first audio data is being sent to the first recipient device at the same time the second audio data is being sent to the second recipient device.

The server(s) 120 may alternatively determine (346) it is unlikely that a single user spoke the first audio data and the second audio data when they are being or were transmitted based on wherein the first audio data and the second audio data originated. For example, the server(s) 120 may determine it is unlikely a single user spoke audio represented in both the first audio data and the second audio data if the first audio data and the second audio data are being or were transmitted five minutes apart but the first audio data originated from the United States of America and the second audio data originated from Asia. The server(s) 120 may be configured such that as the time between the transmissions of the first audio data and the second audio data decreases, the distance between the originating locations of the first audio data and the second audio data that would trigger such a determination may also decrease, and vice versa.

The server(s) 120 may then identify (348) the user ID as being a spam user ID and perform (142) one or more mitigation actions.

As described, the server(s) 120 may determine audio characteristics of overlapping or nearly overlapping communications (in the case where a spammer may conduct non-overlapping communications using devices that are too distant form one another for a user to conceivably travel between the devices between the end of the first communication and the beginning of the second communication) are associated with the same user ID. The server(s) 120 may also determine text transcripts of the overlapping or nearly overlapping communications (e.g., calls or messages) are identical, or similar within a threshold deviation. The server(s) 120 may further determine text of a number of messages, satisfying a threshold number of messages, is identical, or similar within a threshold deviation. This enables the server(s) 120 to determine when spammers are sending the same message to numerous recipients.

One skilled in the art will appreciate that the teachings herein enable a system to determine when a spammer is sending spam content using the same or different user IDs or communications IDs. For example, a spammer may send multiple communications to the same or different recipient. The communications may correspond to the same content but may originate from different user IDs and/or communications IDs. Based on the communications corresponding to the same content (as determined using fingerprinting or other characteristics of the communications), the system is able to determine the different user IDs and/or communications IDs correspond to spam sources.

Figure 4:
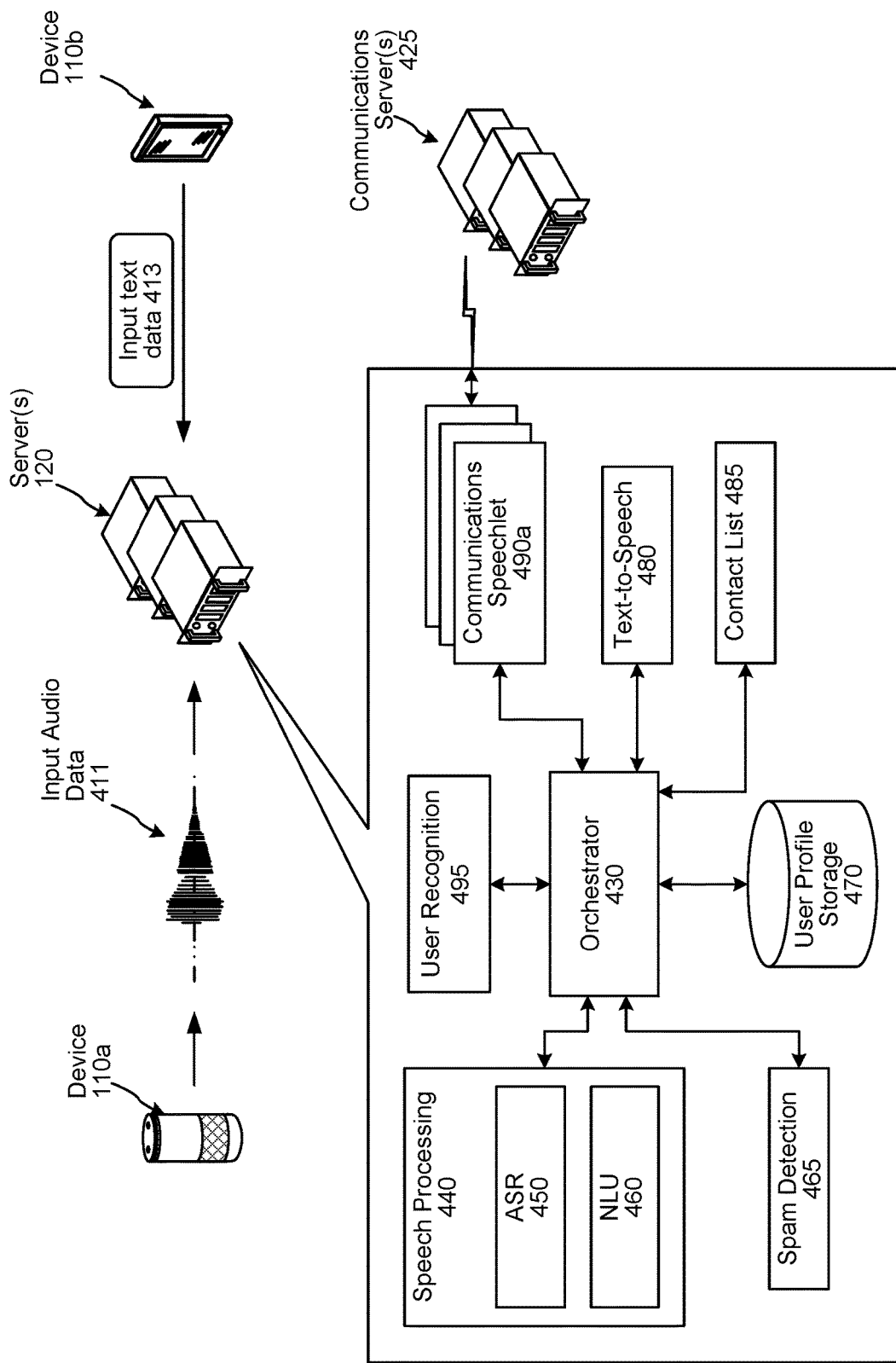
FIG. 4 is a conceptual diagram of components of a system according to embodiments of the present disclosure.

The system may operate using various components as described in FIG. 4. The various components may be located on a same or different physical devices. Communication between various components may occur directly or across a network(s) 199.

The device 110a may send input audio data 411 to the server(s) 120. The input audio data 411 may include a request to perform a call with a recipient device as well as pre-recorded communication payload audio data.

Upon receipt by the server(s) 120, the input audio data 411 may be sent to an orchestrator component 430. The orchestrator component 430 may include memory and logic that enables the orchestrator component 430 to transmit various pieces and forms of data to various components of the system.

The orchestrator component 430 sends the input audio data 411 to a speech processing component 440. An ASR component 450 of the speech processing component 440 transcribes the input audio data 411 into input text data representing one more hypotheses representing audio represented in the input audio data 411. The ASR component 450 interprets the audio in the input audio data 411 based on a similarity between the audio and pre-established language models. For example, the ASR component 450 may compare the input audio data 411 with models for sounds (e.g., subword units, such as phonemes, etc.) and sequences of sounds to identify words that match the sequence of sounds of the audio represented in the input audio data 411. The ASR component 450 sends the input text data generated thereby to an NLU component 460 of the speech processing component 440. The input text data sent from the ASR component 450 to the NLU component 460 may include a top scoring hypothesis or may include an N-best list including multiple hypotheses. An N-best list may additionally include a respective score associated with each hypothesis represented therein. Each score may indicate a confidence of ASR processing performed with respect to the hypothesis with which it is associated.

Alternatively, the device 110b may send input text data 413 to the server(s) 120. Upon receipt by the server(s) 120, the input text data 413 may be sent to the orchestrator component 430. The orchestrator component 430 may send the input text data 413 to the NLU component 460.

The NLU component 460 attempts to make a semantic interpretation of the phrases or statements represented in the input text data input therein. That is, the NLU component 460 determines one or more meanings associated with the phrases or statements represented in the input text data based on individual words represented in the input text data. The NLU component 460 determines an intent represented in the input text data (e.g., an action that a user desires be performed) as well as pertinent pieces of information in the input text data that allow a device (e.g., the device 110a, the device 110b, the server(s) 120, a communications speechlet 490a, the communications server(s) 425, etc.) to execute the intent. For example, if the input text data corresponds to "send 555-5555 a message," the NLU component 460 may determine an intent that the system send a text or audio message to a device associated with the unique ID 555-5555. For further example, if the input text data corresponds to "call 555-5555," the NLU component 460 may determine an intent that the system (e.g., the communications server(s) 425 establish a two-way communication between a device associated with the input text data (e.g., the device 110a whose input audio data 411 is transcribed into input text data using ASR processing) and the device associated with the unique ID 555-5555. In response to such an intent, the system may call a communications speechlet 490a, which may in turn engage a communications server(s) 425, which may perform messaging and two-way communications as described herein below.

A "speechlet" may be software running on the server(s) 120 that is akin to a software application running on a traditional computing device. That is, a speechlet 490 may enable the server(s) 120 to execute specific functionality in order to provide data or produce some other requested output. The server(s) 120 may be configured with more than one speechlet 290. For example, a weather service speechlet may enable the server(s) 120 to provide weather information, a car service speechlet may enable the server(s) 120 to book a trip with respect to a taxi or ride sharing service, an order pizza speechlet may enable the server(s) 120 to order a pizza with respect to a restaurant's online ordering system, a communications speechlet 490a may enable the system to perform messaging or multi-endpoint communications, etc. A speechlet 490 may operate in conjunction between the server(s) 120 and other devices such as a local device 110 in order to complete certain functions. Inputs to a speechlet 490 may come from speech processing interactions or through other interactions or input sources.

A speechlet component/device may include hardware, software, firmware, or the like that may be dedicated to the particular speechlet or shared among different components. The speechlet component may be part of the server(s) 120 (for example as speechlet 490) or may be located at whole (or in part) with separate speechlet server(s). Speechlet server(s) may communicate with speechlets 490 within the server(s) 120 and/or directly with the orchestrator 430 or with other components. For present purposes, unless expressly stated otherwise, reference to a speechlet, speechlet device, or speechlet component (such as speechlet 490) may include a speechlet component operating within server(s) 120 and/or speechlet operating within speechlet server(s).

A speechlet 490 may be configured to perform one or more actions. An ability to perform such an action may sometimes be referred to as a "skill." That is, a skill may enable a speechlet component to execute specific functionality in order to provide data or produce some other output requested by a user. A particular speechlet component may be configured to execute more than one skill/action. For example, a weather service skill may involve a speechlet component providing weather information to the server(s) 120, a car service skill may involve a speechlet component booking a trip with respect to a taxi or ride sharing service, an order pizza skill may involve a speechlet component ordering a pizza with respect to a restaurant's online ordering system, etc.

A speechlet(s) 490 may be in communication with one or more speechlet servers implementing different types of skills. Types of skills include home automation skills (e.g., skills that enable a user to control home devices such as lights, door locks, cameras, thermostats, etc.), entertainment device skills (e.g., skills that enable a user to control entertainment devices such as smart TVs), video skills, flash briefing skills, as well as custom skills that are not associated with any pre-configured type of skill.

The server(s) 120 may include a TTS component 480 that generates audio data from text data using one or more different methods. The audio data generated by the TTS component may then be output to a user as synthesized speech. In one method of synthesis called unit selection, the TTS component 480 matches text data against a database of recorded speech. The TTS component 480 selects matching units of recorded speech and concatenates the units together to form output audio data. In another method of synthesis called parametric synthesis, the TTS component 480 varies parameters such as frequency, volume, and noise to create output audio data including an artificial speech waveform. Parametric synthesis uses a computerized voice generator, sometimes called a vocoder.

The server(s) 120 may include a user profile storage 470. The user profile storage 470 may include a variety of information related to individual users, groups of users, etc. that interact with the system. The user profile storage 470 may include one or more customer profiles. Each customer profile may be associated with a different customer identifier (ID). A customer profile may be an umbrella profile specific to a group of users. That is, a customer profile encompasses two or more individual user profiles, each associated with a respective unique user ID. For example, a customer profile may be a household profile that encompasses user profiles associated with multiple users of a single household. A customer profile may include preferences shared by all the user profiles encompassed thereby. Each user profile encompassed under a single customer profile may include preferences specific to the user associated therewith. That is, each user profile may include preferences unique from one or more other user profiles encompassed by the same customer profile. A user profile may be a stand-alone profile or may be encompassed under a customer profile. As illustrated, the user profile storage 470 is implemented as part of the server(s) 120. However, one skilled in the art will appreciate that the user profile storage 470 may be in communication with the server(s) 120, for example over the network(s) 199.

The server(s) 120 may include a user recognition component 495 that recognizes one or more users associated with data input to the system, as described below. The server(s) 120 may further include a contact list component 485 that manages the storage and maintenance of contact lists associated with user profiles. While illustrated as being a stand alone component, it will be appreciated that the contact list component 485 may be implemented, in whole or in part, by the communications speechlet 490 and/or communications server(s) 425.

The server(s) 120 may also include a spam detection component 465 that determines spam accounts and mitigates accordingly as described herein (including as described with respect to FIGS. 1-3). In some implementations, some or all of the spam detection component 465 may be implemented by the communications speechlet 490 and/or communications server(s) 425.

The spam detection component 465 may determine spam activity based on contact list data, matching fingerprints of simultaneous or substantially simultaneous calls, matching text of a multitude of different messages or call transcriptions, or combinations thereof. Multiple communications corresponding to the same content (e.g., resulting in the same fingerprint or having the same characteristics) may be associated with the same or different user IDs, communications IDs, or the like. The spam detection component 465 may determine the fingerprints or other characteristics of different communication are similar or identical by determining the fingerprints or other characteristics are within a threshold deviation of each other. The spam detection component 465 may implement one or more trained models that take as input more than one of contact list data, fingerprint comparison data, text comparison data, or the like, and output an indication of spam activity associated with a unique ID (e.g., a phone number) or a user profile. The more data that is input to the model(s), the confident the spam detection component 465 may be in its determinations.

The spam detection component 465 may make determinations using data received from various sources. For example, the spam detection component 465 may determine a contact name (represented in contact list data received from, for example, the contact list component 485) corresponds to a spam contact name. The spam detection component 465 may thereafter determine the unique communication number associated with the contact name is associated with more than a threshold number of different user IDs (represented in user profile data received from the user profile storage 470). Thus, collectively using contact list data and user profile data, the spam detection component 465 may determine a unique communication number (e.g., outgoing phone number, outgoing messaging number, etc.) is a spam unique communication number. Going a step further, the spam detection component 465 may further determine the unique communication number is a spam unique communication number based on calling frequency, call answering frequency, and/or call duration as described below.

Spammer contact lists may not include populated first and/or last names of contacts. Rather, spammer contact lists may simply include sequential communication numbers (e.g., phone numbers). Thus, the spam detection component 465 may analyze a contact list to determine whether names of contacts are populated and/or whether sequential communication numbers are present. Output of such analysis may be input to a model(s) along with other data to determine if a user ID or outgoing communication number associated with the contact list is spam.

The spam detection component 465 may implement one or more machine learned models that determine whether an account is spam based on various inputs. The spam detection component 465 may take as input data from the contact list component 485, communications data from the communications speechlet 490a and/or communications server(s) 425, data from third party systems (e.g., third party VoIP systems), etc. The communications data may represent previous communications activity. For example, the communications data may include call duration data representing durations of various calls performed by the system, communication initiation data representing when audio and/or text messages were sent to recipients and when calls were initiated, as well as other data. The spam detection component 465 may process communication initiation data to determine respective durations of calls performed by outgoing unique IDs, respective frequencies at which outgoing unique IDs sent messages and/or initiate calls, etc. The spam detection component 465 may apply the machine learned model(s) to data received from the contact list component 485 and/or communications data to determine spam accounts. The spam detection component 465 may analyze various data to determine if a single message (e.g., audio message or text message)

The spam detection component 465 may have access to typical user communications data. The typical user communications data may represent how a typical user uses the system to perform communications. For example, the typical user communications data may represent a frequency at which a typical user sends messages or initiates calls. For further example, the typical user communications data may represent a call duration (which may be a represented as a length of time, such as from about 4 minutes to about 8 minutes) of a typical user's calls. The typical user communications data may be determined by processing communications data associated with various users of the system. Such processing may be performed by the spam detection component 465 or another component of the system. The typical user communications data may be input into the machine learned model(s) to determine user accounts associated with system usage data that deviates from typical user system usage data by some threshold.

The model(s) implemented by the spam detection component 465 may be configured to determine when the same or substantially the same message (e.g., audio message or text message) is sent to the same recipient user over time. The model(s) should be able to determine when the same message is sent to the same recipient over time even if the recipient has multiple devices and the message is sent to different devices at different times. For example, the model(s) may be used to determine communications in communications activity data corresponding to the same or substantially same message, determine recipient device identifiers for each of the determined communications, determine user profile data associated with each of the recipient devices, and determine how many of the communications each user profile data is associated with. If a single user profile is associated with a number of communications above a threshold number of communications, the source of the communications may be labeled or otherwise indicated as a source of spam.

The model(s) may determine multiple messages or calls correspond to the same content (e.g., have the same characteristics) but be unable to determine an originating device ID or user ID of the messages or calls. In this situation, the model(s) may generate a unique ID and associate the unique ID with the characteristics of the content (e.g., speech characteristics). Thereafter, when the system receives a new outgoing call or message having the characteristics, the system can be proactive and prevent the outgoing call or message from receiving the intended recipient.

The model(s) of the spam detection component 465 may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories (e.g., spam activity or not spam activity), an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning component, such as the spam detection component 465, requires establishing a "ground truth" for training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Humans may perform investigations with respect to spam unique IDs and user profiles output by the spam detection component 465. The outcomes of the human investigations may be used to retrain the model(s) implemented by the spam detection component 465. For example, the outcomes of human investigations may be used to adjust the weightings the model(s) applies to different input data.

Figure 5:
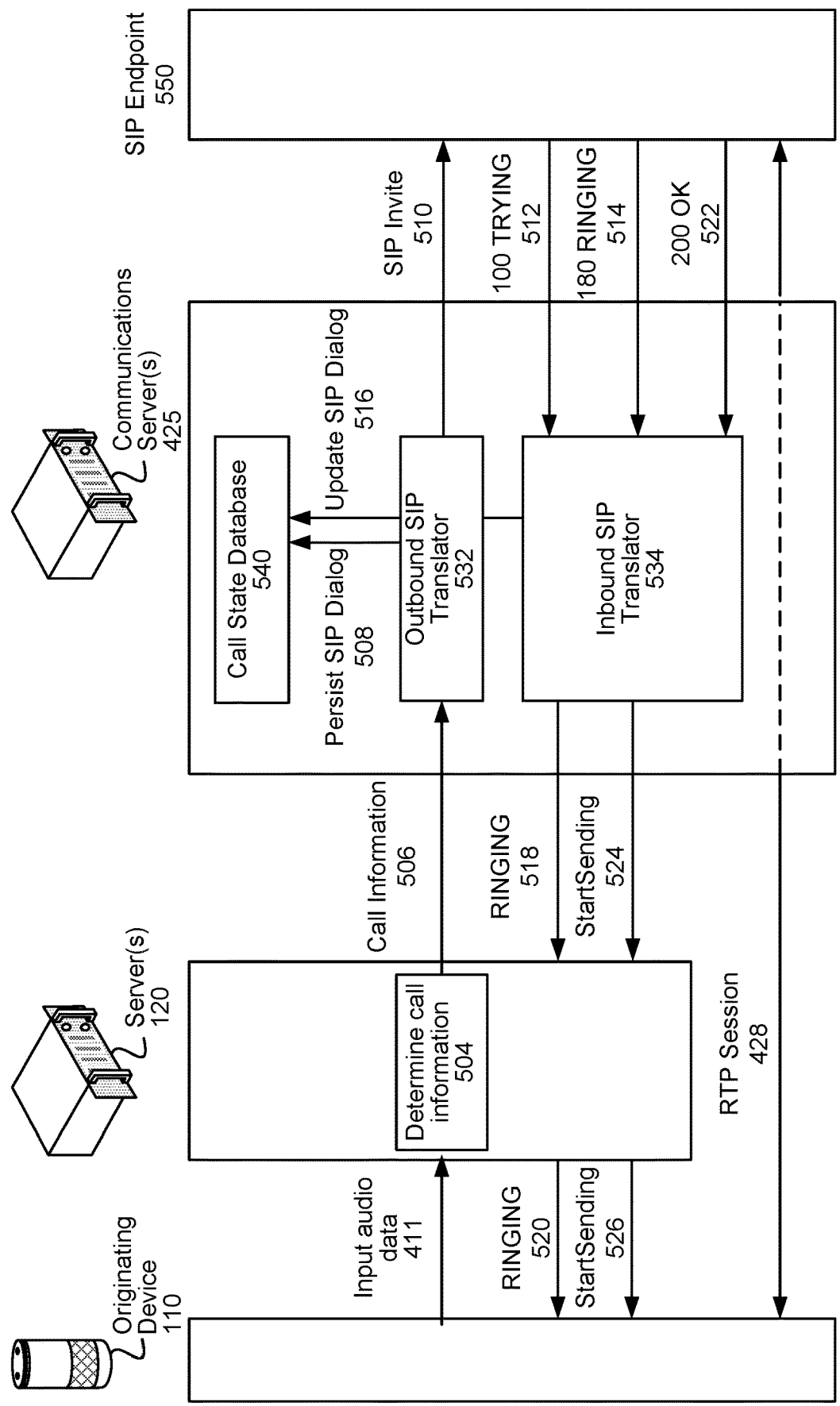
FIG. 5 illustrates an example of signaling to initiate a communication session according to embodiments of the present disclosure.

FIGS. 5-7B illustrate components that can be used to coordinate communications using a system such as that described herein. FIG. 5 illustrates an example of signaling to initiate a communication session according to the present disclosure. In one example configuration, the server(s) 120 is configured to enable voice commands (e.g., perform ASR, NLU, etc. to identify a voice command included in audio data), whereas the communications server(s) 425 is configured to enable communication sessions (e.g., using session initiation protocol (SIP)). For example, the communications server(s) 425 may send SIP messages to endpoints (e.g., recipient devices) in order to establish a communication session for sending and receiving audio data and/or video data. The communication session may use network protocols such as real-time transport protocol (RTP), RTP Control Protocol (RTCP), Web Real-Time communication (WebRTC) and/or the like. For example, the communications server(s) 425 may send SIP messages to initiate a single RTP media stream between two endpoints (e.g., direct RTP media stream between the originating device 110 and a recipient device) and/or to initiate and facilitate RTP media streams between the two endpoints (e.g., RTP media streams between the originating device 110 and the communications server(s) 425 and between the communications server(s) 425 and a recipient device). During a communication session, the communications server(s) 425 may initiate two media streams, with a first media stream corresponding to incoming audio data from the originating device 110 to the recipient device and a second media stream corresponding to outgoing audio data from the recipient device to the originating device 110, although for ease of explanation this may be illustrated as a single RTP media stream.

As illustrated in FIG. 5, the originating device 110 may send (402) the input audio data 411 to the server(s) 120 and the server(s) 120 may determine (504) call information using the input audio data 411 and may send (506) the call information to the communications server(s) 425 (e.g., via the communications speechlet 490a). The server(s) 120 may determine the call information by performing ASR, NLU, etc., as discussed herein, and the call information may include a data source name (DSN), a number from which to call, a number to which to call, encodings, and/or additional information. For example, the server(s) 120 may identify from which phone number the originating user 5 would like to initiate the call, to which phone number the originating user 5 would like to initiate the call, from which device 110 the originating user 5 would like to perform the call, etc.

While FIG. 5 illustrates the server(s) 120 sending the call information to the communications server(s) 425 in a single step (e.g., 506), the disclosure is not limited thereto. Instead, the server(s) 120 may send the call information to the originating device 110 and the originating device 110 may send the call information to the communications server(s) 425 in order to initiate the call without departing from the disclosure. Thus, the server(s) 120 may not communicate directly with the communications server(s) 425 in step 506, but may instead instruct the originating device 110 to connect to the communications server(s) 425 in order to initiate the call.

The communications server(s) 425 may include an outbound SIP translator 532, an inbound SIP translator 534, and a call state database 540. The outbound SIP translator 532 may include logic to convert commands received from the server(s) 120 into SIP requests/responses and may handle sending outgoing SIP requests and sending responses to incoming SIP requests. After receiving the call information, the outbound SIP translator 532 may persist (508) a SIP dialog using the call state database 540. For example, the DSN may include information such as the name, location, and driver associated with the call state database 540 (and, in some examples, a user ID and password of the originating user 5) and the outbound SIP translator 42532 may send a SIP dialog to the call state database 540 regarding the communication session. The call state database 540 may persist the call state if provided a device ID and one of a call ID or a dialog ID. The outbound SIP translator 532 may send (510) a SIP Invite to a SIP Endpoint 550 (e.g., a recipient device, a Session Border Controller (SBC), or the like).

The inbound SIP translator 534 may include logic to convert SIP requests/responses into commands to send to the server(s) 120 and may handle receiving incoming SIP requests and incoming SIP responses. The SIP endpoint 550 may send (512) a 100 TRYING message to the inbound SIP translator 534 and may send (514) a 180 RINGING message to the inbound SIP translator 534. The inbound SIP translator 534 may update (516) the SIP dialog using the call state database 540 and may send (518) a RINGING message to the server(s) 120, which may send (520) the RINGING message to the originating device 110.

When the communication session is accepted by the SIP endpoint 550, the SIP endpoint 550 may send (522) a 200 OK message to the inbound SIP translator 534, the inbound SIP translator 445 may send (524) a startSending message to the server(s) 120, and the server(s) 120 may send (526) the startSending message to the originating device 110. The startSending message may include information associated with an internet protocol (IP) address, a port, encoding, or the like required to initiate the communication session. Using the startSending message, the originating device 110 may establish (428) an RTP communication session with the SIP endpoint 550 via the communications server(s) 425.

While FIG. 5 illustrates the communications server(s) 425 sending the RINGING message and the startSending message to the originating device 110 via the server(s) 120, the disclosure is not limited thereto. Instead, steps 518 and 520 may be combined into a single step and the communications server(s) 425 may send the RINGING message directly to the originating device 110 without departing from the disclosure. Similarly, steps 524 and 526 may be combined into a single step and the communications server(s) 425 may send the startSending message directly to the originating device 110 without departing from the disclosure. Thus, the communications server(s) 425 may communicate with the originating device 110 directly without using the server(s) 120 as an intermediary.

For ease of explanation, the disclosure illustrates the system using SIP. However, the disclosure is not limited thereto and the system may use any communication protocol for signaling and/or controlling communication sessions without departing from the disclosure. Similarly, while some descriptions of the communication sessions refer only to audio data, the disclosure is not limited thereto and the communication sessions may include audio data, video data, and/or any other multimedia data without departing from the disclosure.

Figure 6A:
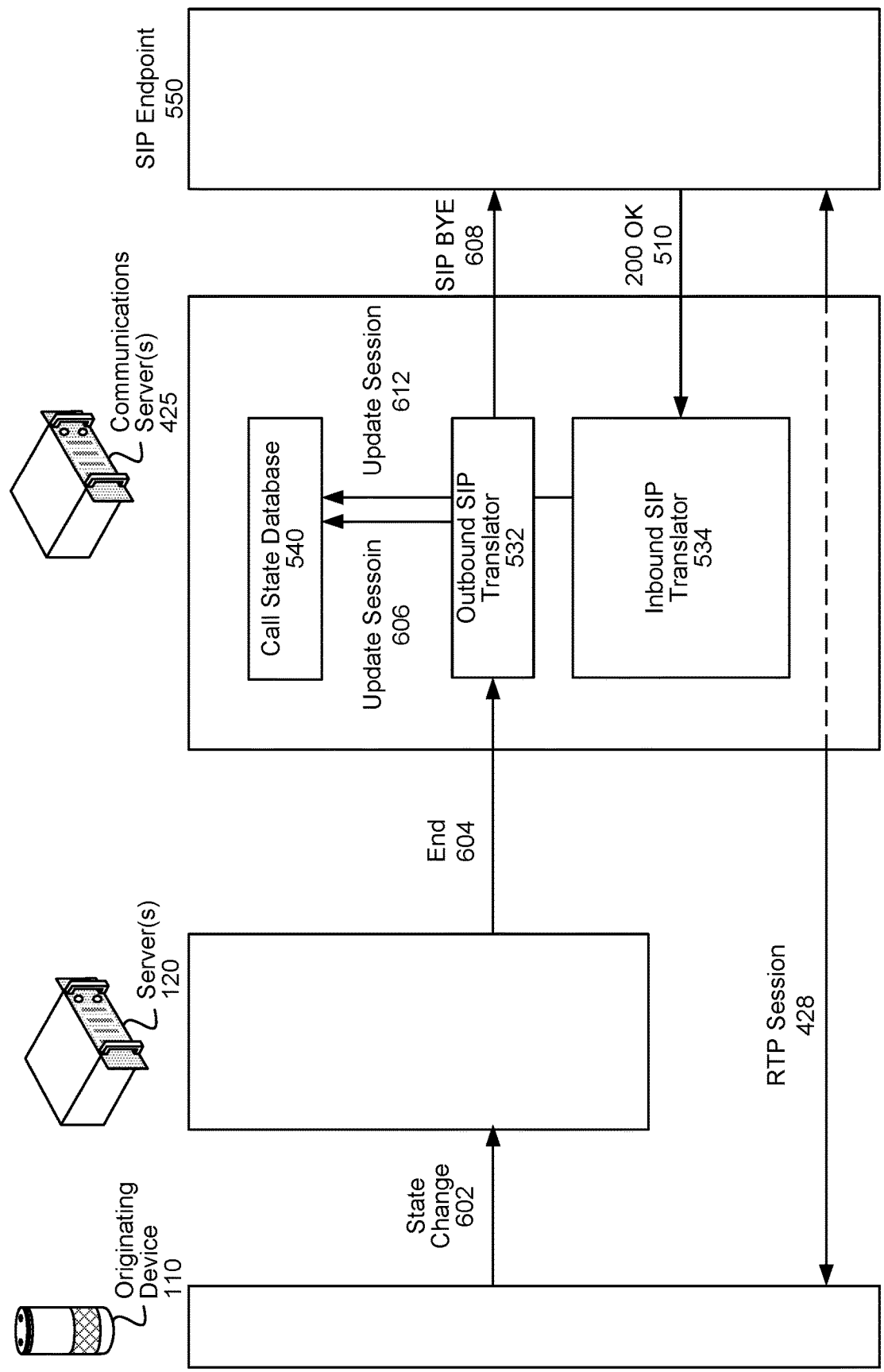
FIGS. 6A and 6B illustrate examples of signaling to end a communication session according to embodiments of the present disclosure.
Figure 6B:
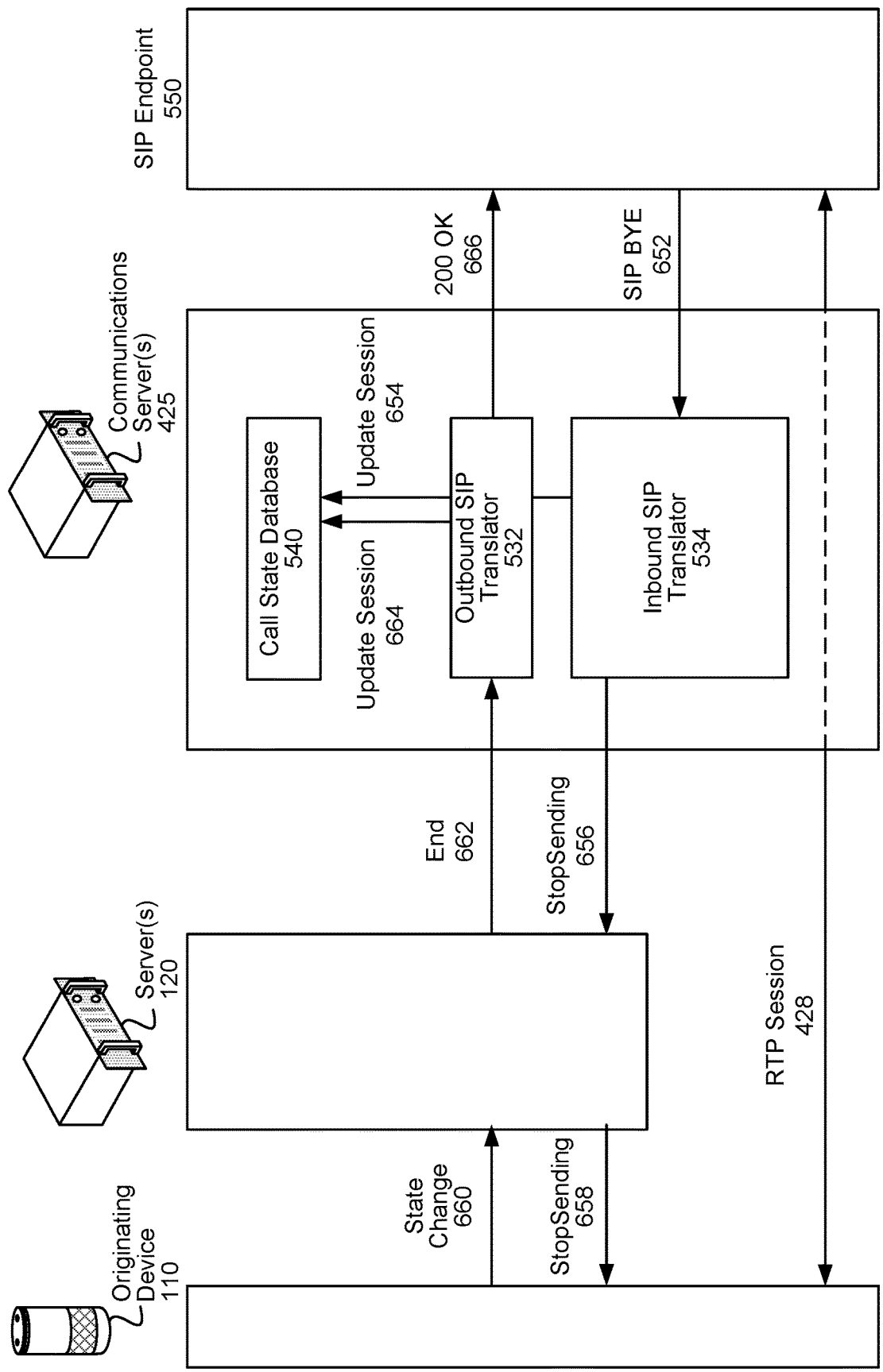

FIGS. 6A and 6B illustrate examples of signaling to end a communication session according to the present disclosure. After establishing the RTP communication session 428 between the originating device 110 and the SIP endpoint 550, the RTP communication session may be ended by the originating user 5 inputting a command to end the call to the originating device 110, as illustrated in FIG. 6A, or a recipient user inputting a command to end the call to the SIP endpoint 550, as illustrated in FIG. 6B.

As illustrated in FIG. 6A, the originating device 110 may send (602) a state change message to the server(s) 120 and the server(s) 120 may send (604) an end message to the communications server(s) 425. The outbound SIP translator 42532 may update (606) the session using the call state database 540 and may send (608) a SIP BYE message to the SIP endpoint 550. The SIP endpoint 550 may send (510) a 200 OK message to the inbound SIP translator 534 and the inbound SIP translator 534 may update (612) the session using the call state database 540. In some examples, the inbound SIP translator 534 may send the 200 OK message to the originating device 110 to confirm that the communication session has been ended. Thus, the RTP communication session 428 may be ended between the originating device 110 and the SIP endpoint 550.

As illustrated in FIG. 6B, the SIP endpoint 550 may send (652) a SIP BYE message to the inbound SIP translator 534 and the inbound SIP translator 534 may update (654) the session using the call state database 540. The inbound SIP translator 534 may send (656) a stopSending message to the server(s) 120 and the server(s) 120 may send (658) the stopSending message to the originating device 110. The originating device 110 may send (660) a state change message to the server(s) 120 and the server(s) 120 may send (662) an End message to the outbound SIP translator 532, the End message including a DSN. The outbound SIP translator 532 may then update (664) the session using the call state database 540, and send (666) a 200 OK message to the SIP endpoint 550. Thus, the RTP communication session 428 may be ended between the originating device 110 and the SIP endpoint 550.

While FIGS. 6A and 6B illustrate the server(s) 120 acting as an intermediary between the originating device 110 and the communications server(s) 425, the disclosure is not limited thereto. Instead, steps 602 and 604 may be combined into a single step and the originating device 110 may directly send the state change message and/or the End message to the communications server(s) 425 without departing from the disclosure. Similarly, steps 666 and 658 may be combined into a single step and the communications server(s) 425 may send the StopSending message directly to the originating device 110 without departing from the disclosure, and/or steps 660 and 662 may be combined into a single step and the originating device 110 may directly send the state change message and/or the End message to the communications server(s) 425 without departing from the disclosure.

While FIGS. 5, 6A, and 6B illustrate the RTP communication session 428 being established between the originating device 110 and the SIP endpoint 550, the disclosure is not limited thereto and the RTP communication session 428 may be established between the originating device 110 and a telephone network associated with the SIP endpoint 550 without departing from the disclosure.

Figure 7A:
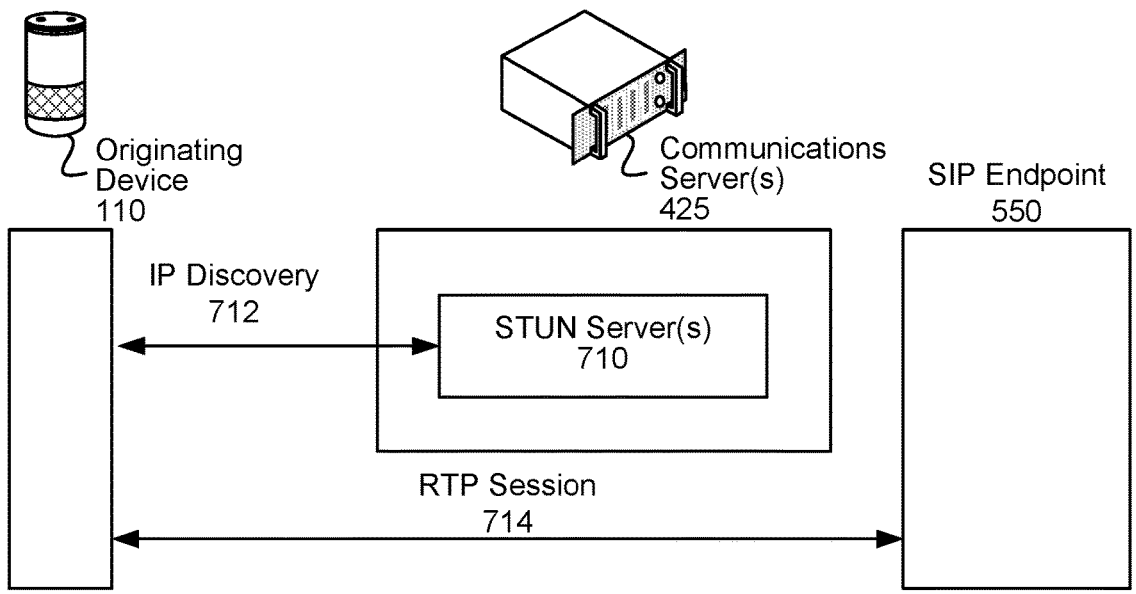
FIGS. 7A and 7B illustrate examples of establishing media streams between devices according to embodiments of the present disclosure.
Figure 7B:
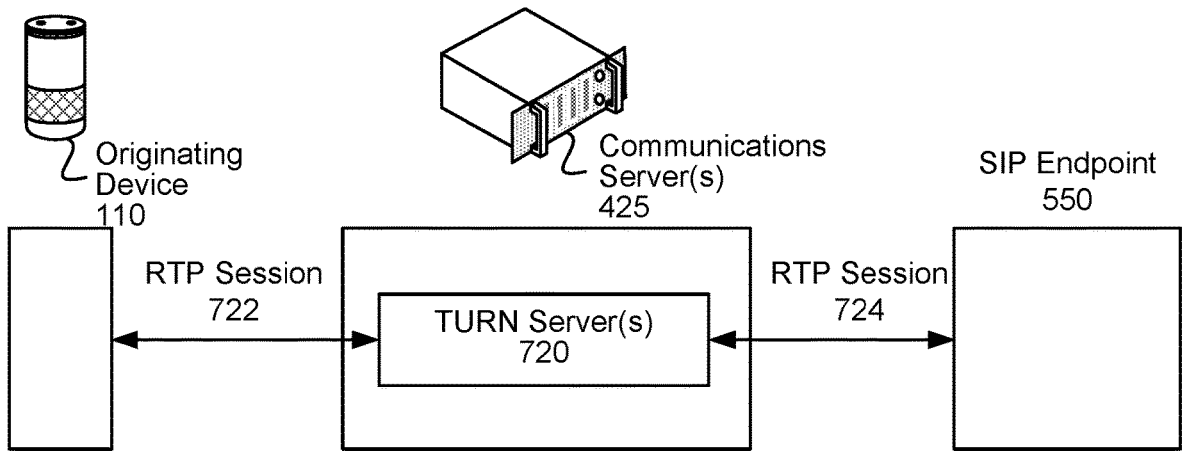

FIGS. 7A and 7B illustrate examples of establishing media streams between devices according to the present disclosure. In some examples, the originating device 110 may have a publicly accessible IP address and may be configured to establish the RTP communication session directly with the SIP endpoint 550. To enable the originating device 110 to establish the RTP communication session, the communications server(s) 425 may include Session Traversal of User Datagram Protocol (UDP) Through Network Address Translators (NATs) server(s) (e.g., STUN server(s) 710). The STUN server(s) 710 may be configured to allow NAT clients (e.g., an originating device 110 behind a firewall) to setup calls to a VoIP provider hosted outside of the local network by providing a public IP address, the type of NAT they are behind, and a port identifier associated by the NAT with a particular local port. As illustrated in FIG. 7A, the originating device 110 may perform (712) IP discovery using the STUN server(s) 710 and may use this information to set up an RTP communication session 714 (e.g., UDP communication) between the originating device 110 and the SIP endpoint 550 to establish a call.

In some examples, the originating device 110 may not have a publicly accessible IP address. For example, in some types of NAT the originating device 110 cannot route outside of the local network. To enable the originating device 110 to establish an RTP communication session, the communications server(s) 425 may include Traversal Using relays around NAT (TURN) server(s) 720. The TURN server(s) 720 may be configured to connect the originating device 110 to the SIP endpoint 550 when the originating device 110 is behind a NAT. As illustrated in FIG. 7B, the originating device 110 may establish (722) an RTP session with the TURN server(s) 720 and the TURN server(s) 720 may establish (724) an RTP session with the SIP endpoint 550. Thus, the originating device 110 may communicate with the SIP endpoint 550 via the TURN server(s) 720. For example, the originating device 110 may send outgoing audio data to the communications server(s) 425 and the communications server(s) 425 may send the outgoing audio data to the SIP endpoint 550. Similarly, the SIP endpoint 550 may send incoming audio data to the communications server(s) 425 and the communications server(s) 425 may send the incoming audio data to the originating device 110.

In some examples, the system may establish communication sessions using a combination of the STUN server(s) 710 and the TURN server(s) 720. For example, a communication session may be more easily established/configured using the TURN server(s) 720, but may benefit from latency improvements using the STUN server(s) 710. Thus, the system may use the STUN server(s) 710 when the communication session may be routed directly between two devices and may use the TURN server(s) 720 for all other communication sessions. Additionally or alternatively, the system may use the STUN server(s) 710 and/or the TURN server(s) 720 selectively based on the communication session being established. For example, the system may use the STUN server(s) 710 when establishing a communication session between two devices (e.g., point-to-point) within a single network (e.g., corporate LAN and/or WLAN), but may use the TURN server(s) 720 when establishing a communication session between two devices on separate networks and/or three or more devices regardless of network(s). When the communication session goes from only two devices to three or more devices, the system may need to transition from the STUN server(s) 710 to the TURN server(s) 720. Thus, if the system anticipates three or more devices being included in the communication session, the communication session may be performed using the TURN server(s) 720.

Figure 8:
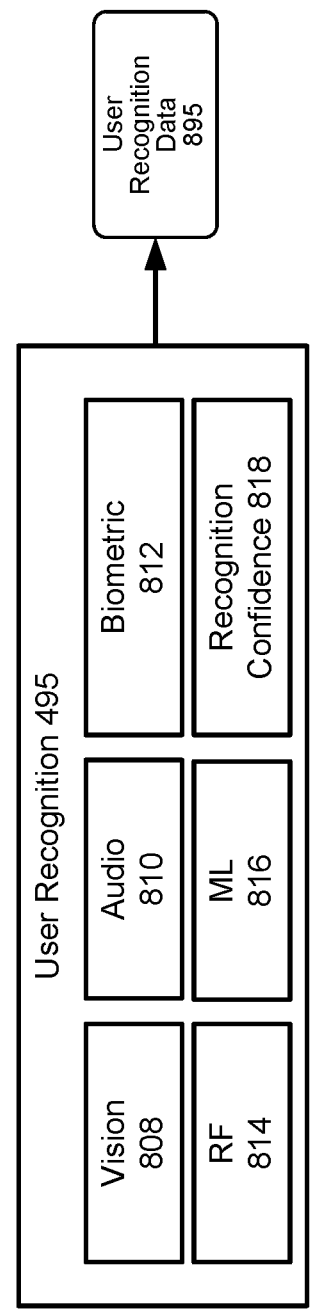
FIG. 8 is a schematic diagram of an illustrative architecture in which sensor data is combined to recognize one or more users according to embodiments of the present disclosure.

As detailed above, the server(s) 120 may include a user recognition component 495 that recognizes one or more users using a variety of data. As illustrated in FIG. 8, the user recognition component 495 may include one or more subcomponents including a vision component 808, an audio component 810, a biometric component 812, a radio frequency (RF) component 814, a machine learning (ML) component 816, and a recognition confidence component 818. In some instances, the user recognition component 895 may monitor data and determinations from one or more subcomponents to determine an identity of one or more users associated with data input to the system. The user recognition component 495 may output user recognition data 895, which may include a user ID associated with a user the system believes is originating data input to the system. The user recognition data 895 may be used to inform processes performed by the spam detection component 465.

The vision component 808 may receive data from one or more sensors capable of providing images (e.g., cameras) or sensors indicating motion (e.g., motion sensors). The vision component 808 can perform facial recognition or image analysis to determine an identity of a user and to associate that identity with a user profile associated with the user. In some instances, when a user is facing a camera, the vision component 808 may perform facial recognition and identify the user with a high degree of confidence. In other instances, the vision component 808 may have a low degree of confidence of an identity of a user, and the user recognition component 495 may utilize determinations from additional components to determine an identity of a user. The vision component 808 can be used in conjunction with other components to determine an identity of a user. For example, the user recognition component 495 may user data from the vision component 808 with data from the audio component 810 to identify what user's face appears to be speaking at the same time audio is captured by a device the user is facing for purposes of identifying a user who spoke an utterance.

The system may include biometric sensors that transmit data to the biometric component 812. For example, the biometric component 812 may receive data corresponding to fingerprints, iris or retina scans, thermal scans, weights of users, a size of a user, pressure (e.g., within floor sensors), etc., and may determine a biometric profile corresponding to a user. The biometric component 812 may distinguish between a user and sound from a television, for example. Thus, the biometric component 812 may incorporate biometric information into a confidence level for determining an identity of a user. Biometric information output by the biometric component 812 can be associated with a specific user profile such that the biometric information uniquely identifies a user profile of a user.

The RF component 814 may use RF localization to track devices that a user may carry or wear. For example, a user (and a user profile associated with the user) may be associated with a computing device. The computing device may emit RF signals (e.g., Wi-Fi, Bluetooth®, etc.). A device may detect the signal and indicate to the RF component 814 the strength of the signal (e.g., as a received signal strength indication (RSSI)). The RF component 814 may use the RSSI to determine an identity of a user (with an associated confidence level). In some instances, the RF component 814 may determine that a received RF signal is associated with a mobile device that is associated with a particular user.

In some instances, a device 110 may include some RF or other detection processing capabilities so that a user who speaks an utterance may scan, tap, or otherwise acknowledge his/her personal device (such as a phone) to the device 110. In this manner, the user may "register" with the system for purposes of the system determining who spoke a particular utterance. Such a registration may occur prior to, during, or after speaking of an utterance.

The ML component 816 may track the behavior of various users as a factor in determining a confidence level of the identity of the user. By way of example, a user may adhere to a regular schedule such that the user is at a first location during the day (e.g., at work or at school). In this example, the ML component 816 would factor in past behavior and/or trends into determining the identity of the user that spoke an utterance to the system. Thus, the ML component 816 may use historical data and/or usage patterns over time to increase or decrease a confidence level of an identity of a user.

In some instances, the recognition confidence component 818 receives determinations from the various components 808, 810, 812, 814, and 816816816, and may determine a final confidence level associated with the identity of a user. In some instances, the confidence level may determine whether an action is performed. For example, if a user request includes a request to unlock a door, a confidence level may need to be above a threshold that may be higher than a confidence level needed to perform a user request associated with playing a playlist or sending a message. The confidence level or other score data may be included in the user recognition data 895.

The audio component 810 may receive data from one or more sensors capable of providing an audio signal (e.g., the device 110a, one or more microphones, etc.) to facilitate recognizing a user. The audio component 810 may perform audio recognition on an audio signal to determine an identity of the user and an associated user profile. In some instances, aspects of the server(s) 120 may be configured at a computing device (e.g., a local server). Thus, in some instances, the audio component 810 operating on a computing device may analyze all sound to facilitate recognizing a user. In some instances, the audio component 810 may perform voice recognition to determine an identity of a user.

The audio component 810 may also perform user identification based on input audio data 411 input into the system for speech processing. The audio component 810 may determine scores indicating whether the input audio data 411 originated from particular users. For example, a first score may indicate a likelihood that the input audio data 411 originated from a first user, a second score may indicate a likelihood that the input audio data 411 originated from a second user, etc. The audio component 810 may perform user recognition by comparing audio characteristics in the input audio data 411 to stored audio characteristics of users.

Figure 9:
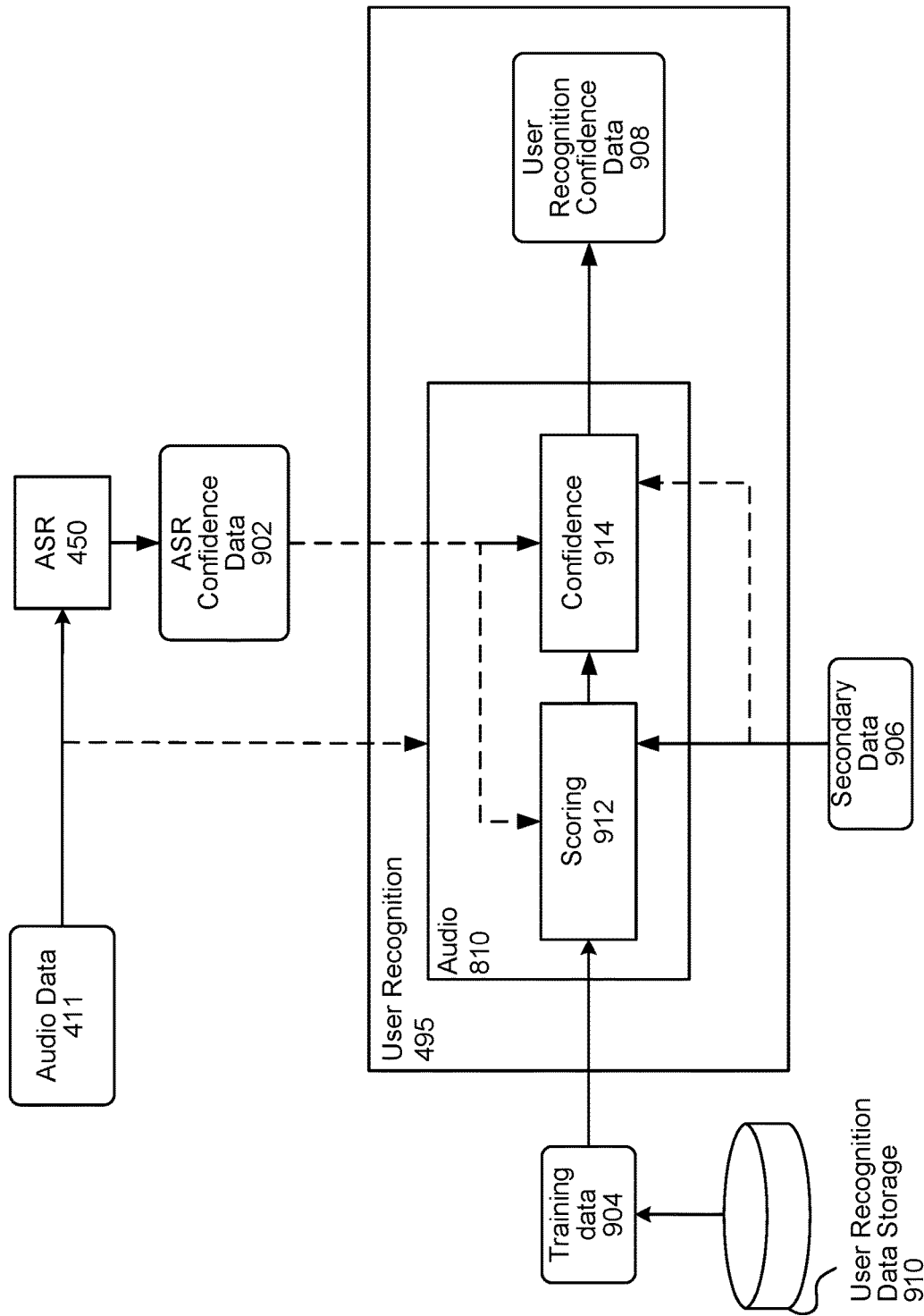
FIG. 9 is a system flow diagram illustrating user recognition according to embodiments of the present disclosure.

FIG. 9 illustrates the audio component 810 of the user recognition component 495 performing user recognition using audio data, for example input audio data 411, which may correspond to pre-recorded audio that is intended to be sent to multiple recipients by a spammer. In addition to outputting text data as described above, the ASR component 450 may also output ASR confidence data 902, which is passed to the user recognition component 495. The audio component 810 performs user recognition using various data including the audio data 411, training data 904 corresponding to sample audio data corresponding to known users, the ASR confidence data 902, and secondary data 906. The audio component 810 may output user recognition confidence data 908 that reflects a certain confidence that the input audio data 411 includes audio spoken by one or more particular users. The user recognition confidence data 908 may include an indicator of a verified user (such as a user ID corresponding to the speaker of the audio) along with a confidence value corresponding to the user ID, such as a numeric value or binned value as discussed below. The user recognition confidence data 908 may be used by various other components of the user recognition component 495 to recognize a user as well as the spam detection component 465.

The training data 904 may be stored in a user recognition data storage 910. The user recognition data storage 910 may be stored by the server(s) 120, or may be a separate device. Further, the user recognition data storage 910 may be part of a user profile in the profile storage 470. The user recognition data storage 910 may be a cloud-based storage. The training data 904 stored in the user recognition data storage 910 may be stored as waveforms and/or corresponding features/vectors. The training data 910 may correspond to data from various audio samples, each audio sample associated with a known user and/or user identity. The audio samples may correspond to voice profile data for one or more users. For example, each user known to the system may be associated with some set of training data 904/voice profile data for the known user. Thus, the training data 904 may include a biometric representation of a user's voice. The audio component 810 may use the training data 904 to compare against incoming audio data 411 to determine the identity of a user that spoke the audio represented in the audio data 411. The training data 904 stored in the user recognition data storage 910 may thus be associated with multiple users of multiple devices. Thus, the training data 904 stored in the user recognition data storage 810 may be associated with both a user that spoke the respective utterance, as well as the device 110 that captured the respective utterance.

To perform user recognition, the audio component 810 may determine the device 110 from which the input audio data 411 originated. For example, the input audio data 411 may include a tag or other metadata indicating the device 110. Either the device 110 or the server(s) 120 may tag the input audio data 411 as such. The user recognition component 495 may send a signal to the user recognition data storage 910, with the signal requesting only training data 904 associated with known users of the device 110 from which the input audio data 411 originated. This may include accessing a user profile(s) associated with the device 110 and then only inputting (to the audio component 810) training data 904 associated with users corresponding to the user profile(s) of the device 110. This limits the universe of possible training data 904 the audio component 810 should consider at runtime when recognizing a user and thus decreases the amount of time to perform user recognition by decreasing the amount of training data 904 needed to be processed. Alternatively, the user recognition component 495 may access all (or some other subset of) training data 904 available to the system.

If the audio component 810 receives training data 904 as an audio waveform, the audio component 810 may determine features/vectors of the waveform(s) or otherwise convert the waveform(s) into a data format (e.g., fingerprint) that can be used by the audio component 810 to actually perform the user recognition. Likewise, if the audio component 810 receives the input audio data 411 as an audio waveform, the audio component 810 may determine features/vectors of the waveform(s) or otherwise convert the waveform(s) into a fingerprint unique to the input audio data 411. A fingerprint may be unique but irreversible such that a fingerprint is unique to underlying audio data by cannot be used to reproduce the underlying audio data. The audio component 810 may identify the user that spoke the audio represented in the input audio data 411 by comparing features/vectors/fingerprint of the input audio data 411 to training features/vectors/fingerprints (either received from the user recognition data storage 910 or determined from training data 904 received from the user recognition data storage 910).

The audio component 810 may include a scoring component 912 which determines respective scores indicating whether the audio represented by the audio data 411 was spoken by particular users (represented by the training data 904). The audio component 810 may also include a confidence component 914 that determines an overall confidence as the accuracy of the user recognition operations (such as those of the scoring component 912) and/or an individual confidence for each user potentially identified by the scoring component 912. The output from the scoring component 912 may include scores for all users with respect to which user recognition was performed (e.g., all users associated with the device 110 that originated the input audio data 411). For example, the output may include a first score for a first user, a second score for a second user, and third score for a third user, etc. Although illustrated as two separate components, the scoring component 912 and confidence component 914 may be combined into a single component or may be separated into more than two components.

The scoring component 912 and confidence component 914 may implement one or more trained machine learning models (such neural networks, classifiers, etc.) as known in the art. For example, the scoring component 912 may use probabilistic linear discriminant analysis (PLDA) techniques. PLDA scoring determines how likely it is that an input audio data feature vector corresponds to a particular training data feature vector for a particular user. The PLDA scoring may generate similarity scores for each training feature vector considered and may output the list of scores and users and/or the user ID of the speaker whose training data feature vector most closely corresponds to the input audio data feature vector. The scoring component 912 may also use other techniques such as GMMs, generative Bayesian models, or the like to determine similarity scores.

The confidence component 914 may input various data including information about the ASR confidence 902, audio length (e.g., number of frames of the audio), audio condition/quality data (such as signal-to-interference data or other metric data), fingerprint data, image data, or other factors to consider how confident the audio component 810 is with regard to the scores linking users to the input audio data 411. The confidence component 914 may also consider the similarity scores and user IDs output by the scoring component 912. Thus, the confidence component 914 may determine that a lower ASR confidence represented in the ASR confidence data 902, or poor input audio quality, or other factors, may result in a lower confidence of the audio component 810. Whereas a higher ASR confidence represented in the ASR confidence data 902, or better input audio quality, or other factors, may result in a higher confidence of the audio component 810. Precise determination of the confidence may depend on configuration and training of the confidence component 914 and the models used therein. The confidence component 914 may operate using a number of different machine learning models/techniques such as GMM, neural networks, etc. For example, the confidence component 914 may be a classifier configured to map a score output by the scoring component 912 to a confidence.

The audio component 810 may output user recognition confidence data 908 specific to a single user, or multiple users in the form of an N-best list. For example, the audio component 810 may output user recognition confidence data 908 with respect to each user indicated in the profile associated with the device 110 from which the input audio data 411 originated.

The user recognition confidence data 908 may include particular scores (e.g., 0.0-1.0, 0-1000, or whatever scale the system is configured to operate). Thus the system may output an N-best list of potential users with confidence scores (e.g., John—0.2, Jane—0.8). Alternatively or in addition, the user recognition confidence data 908 may include binned recognition indicators. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." Thus, the system may output an N-best list of potential users with binned scores (e.g., John—low, Jane—high). Combined binned and confidence score outputs are also possible. Rather than a list of users and their respective scores and/or bins, the user recognition confidence data 908 may only include information related to the top scoring user as determined by the audio component 810. The scores and bins may be based on information determined by the confidence component 914. The audio component 810 may also output a confidence value that the scores/bins are correct, where the confidence value indicates how confident the audio component 810 is in the output results. This confidence value may be determined by the confidence component 914.

The confidence component 914 may determine individual user confidences and differences between user confidences when determining the user recognition confidence data 908. For example, if a difference between a first user's confidence score and a second user's confidence score is large, and the first user's confidence score is above a threshold, then the audio component 810 is able to recognize the first user as the user that spoke the audio with a much higher confidence than if the difference between the users' confidences were smaller.

The audio component 810 may perform certain thresholding to avoid incorrect user recognition results being output. For example, the audio component 810 may compare a confidence score output by the confidence component 914 to a confidence threshold. If the confidence score is not above the confidence threshold (for example, a confidence of "medium" or higher), the audio component 810 may not output user recognition confidence data 908, or may only include in that data 908 an indication that a user speaking the audio could not be verified. Further, the audio component 810 may not output user recognition confidence data 908 until enough input audio data 411 is accumulated and processed to verify the user above a threshold confidence. Thus, the audio component 810 may wait until a sufficient threshold quantity of input audio data 411 has been processed before outputting user recognition confidence data 908. The quantity of received input audio data 411 may also be considered by the confidence component 914.

The user recognition component 495 may combine data from components 808-818 to determine the identity of a particular user. As part of its audio-based user recognition operations, the audio component 810 may use secondary data 906 to inform user recognition processing. Thus, a trained model or other component of the audio component 810 may be trained to take secondary data 906 as an input feature when performing recognition. Secondary data 906 may include a wide variety of data types depending on system configuration and may be made available from other sensors, devices, or storage such as user profile data, etc. The secondary data 906 may include a time of day at which the input audio data 411 was captured, a day of a week in which the input audio data 411 was captured, the text data output by the ASR component 450, NLU results data, and/or other data.

In one example, secondary data 906 may include image data or video data. For example, facial recognition may be performed on image data or video data received corresponding to the received input audio data 411. Facial recognition may be performed by the vision component 808, or by another component of the server(s) 120. The output of the facial recognition process may be used by the audio component 810. That is, facial recognition output data may be used in conjunction with the comparison of the features/vectors of the input audio data 411 and training data 904 to perform more accurate user recognition.

The secondary data 906 may also include location data of the device 110. The location data may be specific to a building within which the device 110 is located. For example, if the device 110 is located in user A's bedroom, such location may increase a user recognition confidence associated with user A, but decrease a user recognition confidence associated with user B.

The secondary data 906 may also include data related to the profile of the device 110. For example, the secondary data 906 may further include type data indicating a type of the device 110. Different types of devices may include, for example, a smart watch, a smart phone, a tablet computer, and a vehicle. The type of device may be indicated in the profile associated with the device 110. For example, if the device 110 from which the input audio data 411 was received is a smart watch or vehicle belonging to user A, the fact that the device 110 belongs to user A may increase a user recognition confidence associated with user A, but a decrease user recognition confidence associated with user B. Alternatively, if the device 110 from which the input audio data 411 was received is a public or semi-public device, the system may use information about the location of the device 110 to cross-check other potential user locating information (such as calendar data, etc.) to potentially narrow the potential users to be recognized with respect to the input audio data 411.

The secondary data 906 may additionally include geographic coordinate data associated with the device 110. For example, a profile associated with a vehicle may indicate multiple users (e.g., user A and user B). The vehicle may include a global positioning system (GPS) indicating latitude and longitude coordinates of the vehicle when the input audio data 411 is captured by the vehicle. As such, if the vehicle is located at a coordinate corresponding to a work location/building of user A, such may increase a user recognition confidence associated with user A, but decrease a user recognition confidence of all other users indicated in the profile associated with the vehicle. Global coordinates and associated locations (e.g., work, home, etc.) may be indicated in a user profile associated with the device 110. The global coordinates and associated locations may be associated with respective users in the user profile storage 470.

The secondary data 906 may also include other data/signals about activity of a particular user that may be useful in performing user recognition of input audio data 411. For example, if a user has recently entered a code to disable a home security alarm, and the utterance corresponds to a device at the home, signals from the home security alarm about the disabling user, time of disabling, etc. may be reflected in the secondary data 906 and considered by the audio component 810. If a mobile device (such as a phone, Tile, dongle, or other device) known to be associated with a particular user is detected proximate to (for example physically close to, connected to the same WiFi network as, or otherwise nearby) the device 110, this may be reflected in the secondary data 906 and considered by the audio component 810.

The user recognition confidence data 908 output by the audio component 810 may be used by other components of the user recognition component 495 and/or may be sent to one or more speechlets 490, communications servers 425, the orchestrator 430, the spam detection component 465, or to other components.

Spammers may routinely be hung up on, by a recipient of a call, shortly after the recipient answers the call. For example, after a period of time of answering such a call, the recipient may identify the caller or the content of the call as spam and hang up on the spammer. Many call recipients may engage in similar behavior with respect to received spam calls.

Figure 10:
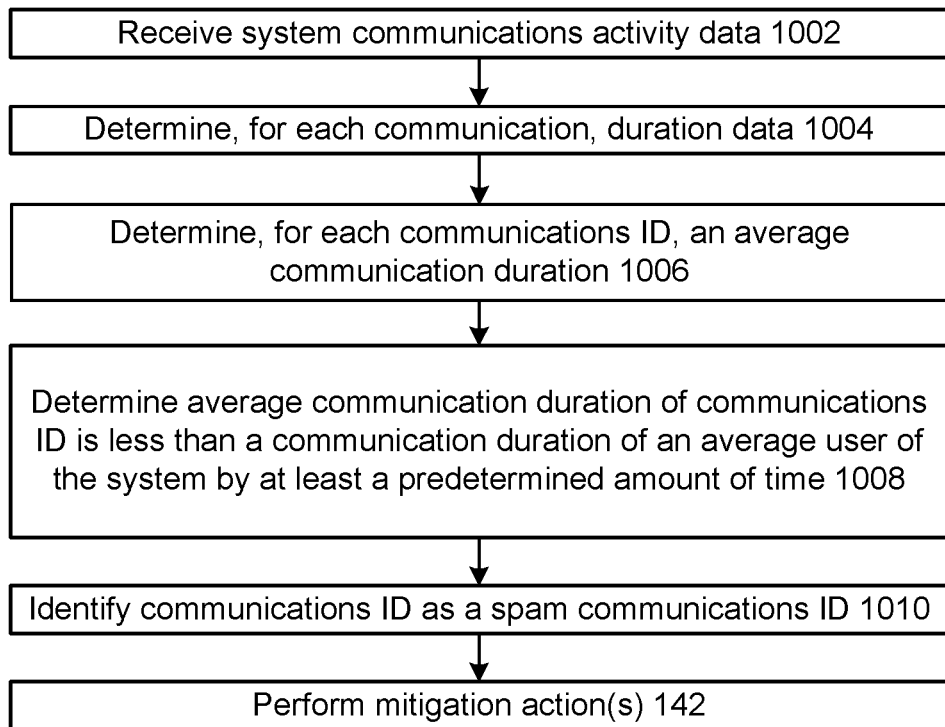
FIG. 10 is a process flow diagram illustrating how a spam detection component may determine spam activity based on communication duration according to embodiments of the present disclosure.

FIG. 10 illustrates how the spam detection component 465 may determine spam activity based on communication duration information. The spam detection component 465 receives (1002) system communications activity data from the communications speechlet 490a, the communications server(s) 425, or some other component of the system. The spam detection component 465 also determines (1004) communication duration data for each communication represented in the communication activity data. For example, a communication represented in the communications activity data may correspond to multiple exchanges of messages (e.g., text and/or audio messages) between two devices, voice messages resulting from the exchange of calls between two devices, landline phone calls, VoIP calls, cellular calls, satellite calls, WiFi direct communications, or any other communications that may occur between two devices associated with two different user profiles.

The spam detection component 465 may determine (1006), for each communications ID represented in the communications activity data, an average communication duration based on the communications duration data associated with the communications ID. Each communications ID may be associated with more than one average communication duration (e.g., one for each type of communication modality). The spam detection component 465 may determine (1008) the average communication duration for a communications ID is less than a communication duration of an average user of the system by at least a predetermined amount of time. If the average communication duration is associated with a specific communication modality, the communication duration of the average user may also be specific to the communication modality. The spam detection component 465 then identifies (1010) the communications ID as being a spam communications ID and performs (142) one or more mitigation actions.

A recipient of spam communications may answer or respond such communications a first number of times the recipient receives the communications. Once the recipient begins to recognize spammer communication IDs, the recipient may stop answering/responding to communications received from those communications IDs. Thus, over time, the answering/response frequency of spammer communication requests may decrease to a point where they diverge from non-spammer communication request answering/response frequencies.

Figure 11:
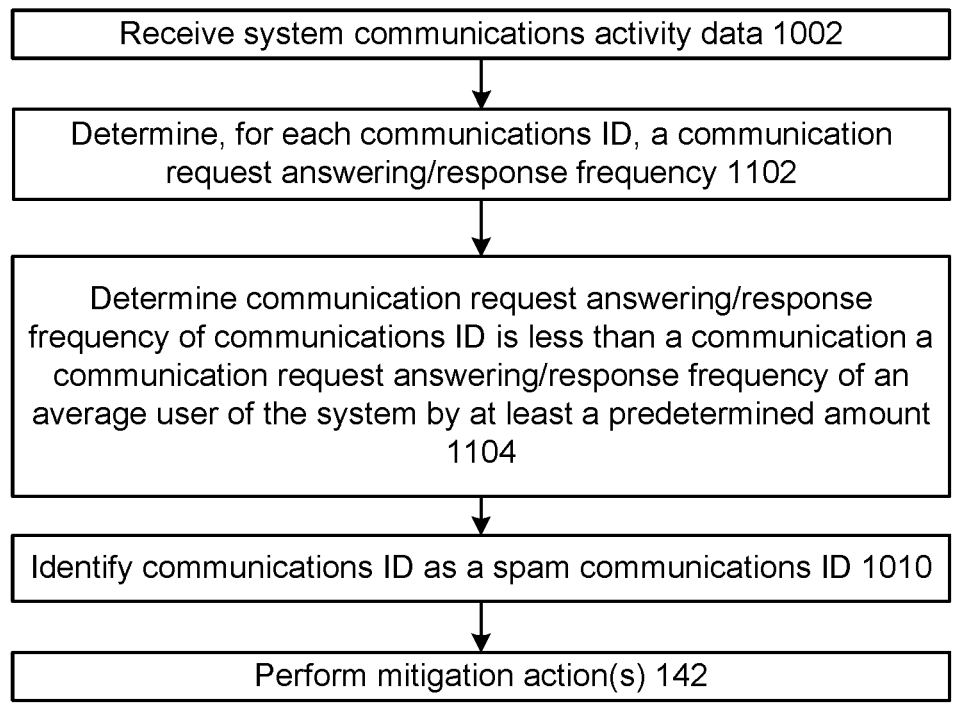
FIG. 11 is a process flow diagram illustrating how a spam detection component may determine spam activity based on communication answering/response frequencies according to embodiments of the present disclosure.

FIG. 11 illustrates how the spam detection component 465 may determine spam activity based on communication answering/response frequencies. The spam detection component 465 receives (1002) system communications activity data from the communications speechlet 490a, the communications server(s) 425, or some other component of the system.

The spam detection component 465 may determine (1102), for each communications ID represented in the communications activity data, a communication request answering/response frequency. Each communications ID may be associated with more than one communication request answering/response frequency (e.g., one for each type of communication modality). The spam detection component 465 may determine (1104) the communications request answering/response frequency of a communications ID is less than a communication request answering/response frequency of an average user of the system by at least a predetermined amount. If the communications request answering/response frequency of the communications ID is associated with a specific communication modality, the communication request answering/response frequency of the average user may also be specific to the communication modality. The spam detection component 465 identifies (1010) the communications ID as being a spam communications ID and performs (142) one or more mitigation actions.

Figure 12:
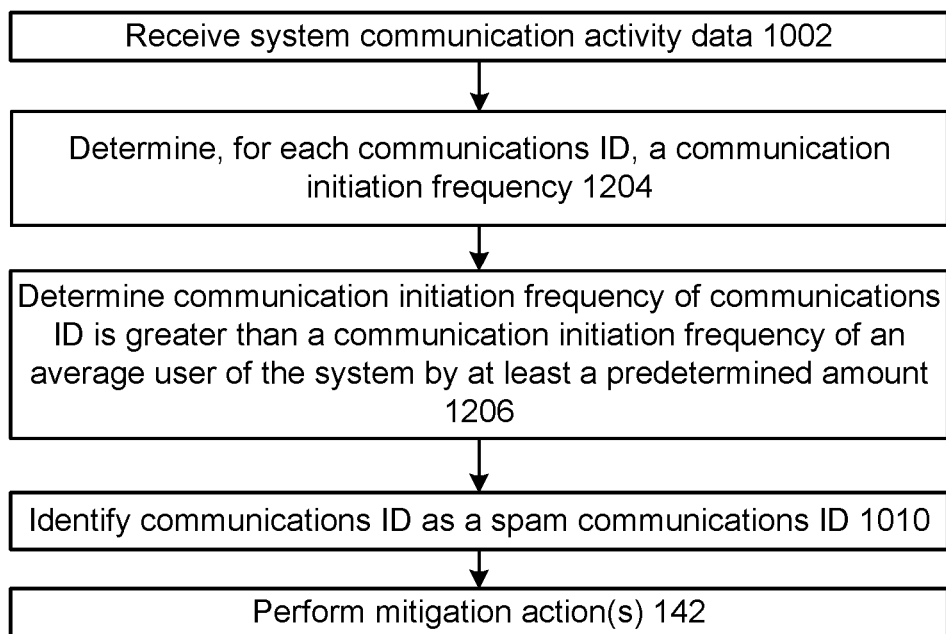
FIG. 12 is a process flow diagram illustrating how a spam detection component may determine spam activity based on a communication initiation frequency according to embodiments of the present disclosure.

Spammers may send communication (e.g., call or messaging) requests (or otherwise attempt to initiate communications) at an increased frequency as compared to non-spam users of a system. FIG. 12 illustrates how the spam detection component 465 may determine spam activity based on communication initiation frequencies. The spam detection component 465 receives (1002) system communication activity data from the communications speechlet 490a, the communications server(s) 425, or some other component of the system.

The spam detection component 465 may determine (1204), for each communications ID represented in the communication activity data, a communication initiation frequency. Each communications ID may be associated with more than one communication initiation frequency (e.g., one for each type of communication modality). For example, the spam detection component 465 may determine, for a given communications ID, a frequency of call initiations (or call request generations) or a frequency of message initiations (e.g., messages including text content). The spam detection component 465 may determine (1206) the communication initiation frequency of the communications ID is greater than a communication initiation frequency of an average user of the system by at least a predetermined amounts. If the communication initiation frequency of the communications ID is associated with a specific communication modality, the communication initiation frequency of the average user may also be specific to the communication modality. The spam detection component 465 identifies (1010) the communications ID as being a spam communications ID and performs (142) one or more mitigation actions.

The spam detection component 465 may operate with respect to all or a portion of the outgoing communication numbers and user IDs associated with the system. In an implementation, the spam detection component 465 may operate with respect to a subset of the outgoing communication numbers and/or user IDs based on trigger activity. For example, the spam detection component 465 may be configured to only operate with respect to outgoing communications numbers and/or user IDs that attempt to become associated with contact list data at or substantially at the same time. Such activity may be due to an automated bot uploading a multitude of sequential communication numbers to various user profiles.

FIG. 13 is a block diagram conceptually illustrating a device 110 that may be used with the system. FIG. 14 is a block diagram conceptually illustrating example components of a remote device, such as the server(s) 120, which may assist with ASR processing, NLU processing, etc. Multiple servers 120 may be included in the system, such as one or more servers 120 for performing ASR processing, one or more servers 120 for performing NLU processing, etc. In operation, each of these devices (or groups of devices) may include computer-readable and computer-executable instructions that reside on the respective device (110/120), as will be discussed further below.

Each of these devices (110/120) may include one or more controllers/processors (1304/1504), which may each include a central processing unit (CPU) for processing data and computer-readable instructions, and a memory (1306/71506) for storing data and instructions of the respective device. The memories (1306/71506) may individually include volatile random access memory (RAM), non-volatile read only memory (ROM), non-volatile magnetoresistive memory (MRAM), and/or other types of memory. Each device (110/120) may also include a data storage component (1308/91508) for storing data and controller/processor-executable instructions. Each data storage component (1308/91508) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (1302/1402).

Computer instructions for operating each device (110/120) and its various components may be executed by the respective device's controller(s)/processor(s) (1304/1504), using the memory (1306/71506) as temporary "working" storage at runtime. A device's computer instructions may be stored in a non-transitory manner in non-volatile memory (1306/71506), storage (1308/91508), or an external device(s). Alternatively, some or all of the executable instructions may be embedded in hardware or firmware on the respective device in addition to or instead of software.

Each device (110/120) includes input/output device interfaces (1302/1402). A variety of components may be connected through the input/output device interfaces (1302/1402), as will be discussed further below. Additionally, each device (110/120) may include an address/data bus (1324/51524) for conveying data among components of the respective device. Each component within a device (110/120) may also be directly connected to other components in addition to (or instead of) being connected to other components across the bus (1324/51524).

Referring to FIG. 13, the device 110 may include input/output device interfaces 1302 that connect to a variety of components such as an audio output component such as a speaker 1312, a wired headset or a wireless headset (not illustrated), or other component capable of outputting audio. The device 110 may also include an audio capture component. The audio capture component may be, for example, a microphone 1320 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1316 for displaying content.

Via antenna(s) 1314, the input/output device interfaces 1302 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1302/1402) may also include communication components that allow data to be exchanged between devices such as different physical servers in a collection of servers or other components.

The components of the device(s) 110 and the server(s) 120 may include their own dedicated processors, memory, and/or storage. Alternatively, one or more of the components of the device(s) 110 and the server(s) 120 may utilize the I/O interfaces (1302/1402), processor(s) (1304/1504), memory (1306/71506), and/or storage (1308/91508) of the device(s) 110 and server(s) 120, respectively. Thus, the ASR component 450 may have its own I/O interface(s), processor(s), memory, and/or storage; the NLU component 460 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110 and the server(s) 120, as described herein, are illustrative, and may be located as a stand-alone device or may be included, in whole or in part, as a component of a larger device or system.

As illustrated in FIG. 15, multiple devices (110*a*-110*g*, 120, 125, 425) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110*a*, a smart phone 110*b*, a smart watch 110*c*, a tablet computer 110*d*, a vehicle 110*e*, a display device 110*f*, and/or a smart television 110*g* may be connected to the network(s) 199 through a wireless service provider, over a WiFi or cellular network connection, or the like. Other devices are included as network-connected support devices, such as the server(s) 120, the communications service provider server(s) 125, the communications server(s) 425, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 450, the NLU component 460, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
    receiving first fingerprint data corresponding to a first spam two-way communication session, the first fingerprint data representing first speech of the first spam two-way communication session;
    receiving first audio data associated with a two-way communication session, the first audio data comprising second speech;
    determining second fingerprint data representing the second speech;
    determining the first fingerprint data corresponds to the second fingerprint data; and
    identifying the two-way communication session as a second spam two-way communication session based at least in part on the first fingerprint data corresponding to the second fingerprint data.

2. The computer-implemented method of claim 1, further comprising:
    determining the first spam two-way communication session was initiated using a first device;
    determining the two-way communication session was initiated using a second device;
    determining a first location of the first device;
    determining a second location of the second device;
    determining a first time when the first spam two-way communication session was initiated; and
    determining a second time when the two-way communication session was initiated,
    wherein identifying the two-way communication session as the second spam two-way communication session is further based at least in part on the first location, the second location, the first time, and the second time.

3. The computer-implemented method of claim 1, further comprising:
    determining an identifier used to initiate the two-way communication session;
    determining two-way communication session activity data associated with the identifier;
    determining, in the two-way communication session activity data, a frequency with which two-way communication requests were answered; and
    identifying the identifier as a spam identifier further based at least in part on the frequency.

4. The computer-implemented method of claim 1, further comprising:
    determining an identifier used to initiate the two-way communication session; and
    determining an average communication duration associated with the identifier,
    wherein identifying the two-way communication session as the second spam two-way communication session is further based at least in part on the average communication duration.

5. A system, comprising:
    at least one processor; and
    at least one memory including instructions that, when executed by the at least one processor, cause the system to:
        receive first fingerprint data corresponding to a first spam communication, the first fingerprint data representing first speech of the first spam communication;
        receive first audio data comprising second speech corresponding to a communication;
        determine second fingerprint data representing the second speech;
        determine the first fingerprint data corresponds to the second fingerprint data; and
        identify the communication as a second spam communication based at least in part on the first fingerprint data corresponding to the second fingerprint data.

6. The system of claim 5, wherein the at least one memory further includes instructions that, when executed by the at least one processor, further cause the system to:
    determine the first spam communication was sent using a first device;
    determine the communication was sent using a second device;
    determine a first location of the first device;
    determine a second location of the second device;
    determine a first time when the first spam communication was sent; and determine a second time when the communication was sent,
wherein the communication is identified as the second spam communication further based at least in part on the first location, the second location, the first time, and the second time.

7. The system of claim 5, wherein the at least one memory further includes instructions that, when executed by the at least one processor, further cause the system to:
generate first text data corresponding to the first speech;
generate second text data corresponding to the second speech; and
determine the first text data corresponds to the second text data,
wherein the communication is identified as the second spam communication further based at least in part on the first text data corresponding to the second text data.

8. The system of claim 5, wherein the at least one memory further includes instructions that, when executed by the at least one processor, further cause the system to:
determine an identifier used to send the communication;
determine communication activity data associated with the identifier;
determine, in the communication activity data, a frequency with which communications were answered; and
identify the identifier as a spam identifier based at least in part on the frequency.

9. The system of claim 5, wherein the at least one memory further includes instructions that, when executed by the at least one processor, further cause the system to:
determine the communication was sent using an identifier; and
identify the identifier as a spam identifier.

10. The system of claim 5, wherein the at least one memory further includes instructions that, when executed by the at least one processor, further cause the system to:
determine an identifier used to send the communication; and
determine an average communication duration associated with the identifier,
wherein the communication is identified as the second spam communication further based at least in part on the average communication duration.

11. The system of claim 5, wherein the at least one memory further includes instructions that, when executed by the at least one processor, further cause the system to:
determine an identifier used to send the communication; and
determine a communications initiation frequency associated with the identifier,
wherein the communication is identified as the second spam communication further based at least in part on the communications initiation frequency.

12. The system of claim 5, wherein the at least one memory further includes instructions that, when executed by the at least one processor, further cause the system to:
receive communications data representing a plurality of communications;
determine the plurality of communications correspond to same communication content;
determine a device received a subset of the plurality of communications;
determine an identifier that was used to send the subset; and
identify the identifier as a spam identifier.

13. A computer-implemented method, comprising:
receiving first fingerprint data corresponding to a first spam communication, the first fingerprint data representing first speech of the first spam communication;
receiving first audio data comprising second speech corresponding to a communication;
determining second fingerprint data representing the second speech;
determining the first fingerprint data corresponds to the second fingerprint data; and
identifying the communication as a second spam communication based at least in part on the first fingerprint data corresponding to the second fingerprint data.

14. The computer-implemented method of claim 13, further comprising:
determining the first spam communication was sent using a first device;
determining the communication was sent using a second device;
determining a first location of the first device;
determining a second location of the second device;
determining a first time when the first spam communication was sent; and
determining a second time when the communication was sent,
wherein identifying the communication as the second spam communication is further based at least in part on the first location, the second location, the first time, and the second time.

15. The computer-implemented method of claim 13, further comprising:
generating first text data corresponding to the first speech;
generating second text data corresponding to the second speech; and
determining the first text data corresponds to the second text data,
wherein identifying the communication as the second spam communication is further based at least in part on the first text data corresponding to the second text data.

16. The computer-implemented method of claim 13, further comprising:
determining an identifier used to send the communication;
determining communication activity data associated with the identifier;
determining, in the communication activity data, a frequency with which communications were answered; and
identifying the identifier as a spam identifier based at least in part on the frequency.

17. The computer-implemented method of claim 13, further comprising:
determining the communication was sent using an identifier; and
identifying the identifier as a spam identifier.

18. The computer-implemented method of claim 13, further comprising:
determining an identifier used to send the communication; and
determining an average communication duration associated with the identifier,
wherein identifying the communication as the second spam communication is further based at least in part on the average communication duration.

19. The computer-implemented method of claim 13, further comprising:
determining an identifier used to send the communication; and determining a communications initiation frequency associated with the identifier,
wherein identifying the communication as the second spam communication is further based at least in part on the communications initiation frequency.

20. The computer-implemented method of claim 13, further comprising:
receiving communications data representing a plurality of communications;
determining the plurality of communications correspond to same communication content;
determining a device received a subset of the plurality of communications;
determining an identifier that was used to send the subset; and
identifying the identifier as a spam identifier.

\* \* \* \* \*